United States Patent
Jia et al.

(10) Patent No.: US 11,234,187 B2
(45) Date of Patent: Jan. 25, 2022

(54) INFORMATION CONFIGURATION METHOD AND MANAGEMENT UNIT

(71) Applicant: HUAWEI TECHNOLOGIES CO., LTD., Guangdong (CN)

(72) Inventors: Xiaoqian Jia, Shanghai (CN); Ruiyue Xu, Shanghai (CN); Kai Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/780,424

(22) Filed: Feb. 3, 2020

(65) Prior Publication Data
US 2020/0178167 A1 Jun. 4, 2020

Related U.S. Application Data

(63) Continuation of application No. PCT/CN2018/098392, filed on Aug. 2, 2018.

(30) Foreign Application Priority Data

Aug. 4, 2017 (CN) .......................... 201710660876.2
Aug. 11, 2017 (CN) .......................... 201710687514.2

(51) Int. Cl.
*H04W 48/18* (2009.01)
*H04W 76/11* (2018.01)
(Continued)

(52) U.S. Cl.
CPC ............. *H04W 48/18* (2013.01); *H04W 8/08* (2013.01); *H04W 48/16* (2013.01); *H04W 76/11* (2018.02); *H04W 84/042* (2013.01)

(58) Field of Classification Search
CPC ..... H04W 48/18; H04W 48/16; H04W 72/00; H04W 72/005; H04W 72/02;
(Continued)

(56) References Cited

U.S. PATENT DOCUMENTS

| | | | |
|---|---|---|---|
| 2018/0317157 A1* | 11/2018 | Baek et al. | ........... H04W 40/20 |
| 2019/0357130 A1* | 11/2019 | Garcia Azorero et al. | ................... H04W 48/18 |
| 2020/0045624 A1* | 2/2020 | Shimojou et al. | .... H04W 48/18 |

FOREIGN PATENT DOCUMENTS

| | | |
|---|---|---|
| CN | 106572516 A | 4/2017 |
| CN | 106982458 A | 7/2017 |

OTHER PUBLICATIONS

SA WG2 Meeting #121,S2-173924(revision of S2-173067),:"Discussion on functionalities of standalone NSSF and NRF in network slicing", May 15-19, 2017, Hangzhou, China,total 11 pages.
(Continued)

*Primary Examiner* — Meless N Zewdu
(74) *Attorney, Agent, or Firm* — Womble Bond Dickinson (US) LLP

(57) ABSTRACT

This application relates to the field of communications, and provides an information configuration method to configure an association relationship between an AMF group and network slice information for an NSSF, a default AMF, or an NRF, so that the NSSF, the default AMF, or the NRF can select an AMF group meeting a service requirement. The method includes: determining, by a first management unit, an association relationship between information about an AMF group and network slice information, where the association relationship is used to instruct to select the network slice information based on the information about the AMF group or select the information about the AMF group based on the network slice information; and sending, by the first management unit, the association relationship to a first network unit or a management unit of a first network unit; or storing, by the first management unit, the association relationship.

18 Claims, 16 Drawing Sheets

(51) Int. Cl.
*H04W 8/08* (2009.01)
*H04W 48/16* (2009.01)
*H04W 84/04* (2009.01)

(58) Field of Classification Search
CPC ....... H04W 72/04; H04W 72/14; H04W 8/08; H04W 76/11; H04W 76/10; H04W 76/00; H04W 84/042; H04W 84/04; H04W 24/02; H04W 48/00; H04W 88/00; H04W 88/02; H04W 88/08; H04W 92/24; H04W 92/02; H04W 88/14; H04W 80/10; H04W 80/00; H04W 8/14; H04W 16/00; H04W 60/00; H04W 80/04; H04W 16/02; H04W 16/04; H04W 16/14; H04W 4/50; H04W 16/10; H04W 16/12; H04W 48/20; H04W 48/12; H04W 67/32; H04W 4/029; H04W 8/00; H04W 28/00; H04W 28/02; H04W 76/15; H04W 88/18; H04W 36/0072; H04W 36/0077; H04W 72/044; H04W 72/0486; H04W 8/26; H04L 41/0803; H04L 67/32; H04L 29/08; H04L 67/14; H04L 41/0893

See application file for complete search history.

(56) References Cited

OTHER PUBLICATIONS

SA WG2 Meeting #121,S2-173151:"TS 23.501: Way forward and Solution for change of AMF / Control of N2 persistence",Nokia,May 15-19, 2017, Hangzhou, China,total 9 pages.

SA WG2 Meeting #122,S2-175223,:"Network Slice instance selection",Huawei,26th Jun. 30, 2017, Cabo, Mexico, total 21 pages.

Huawei, "Add usecase and requirements for management support slice selection", 3GPP TSG SA WG5 (Telecom Management) Meeting #111, S5-171122, Jan. 16-20, 2017, Porto (Portugal), total 7 pages.

NTT Docomo, Ericsson, LG Electronics, Position of Network Slice Selection Function (NSSF) in overall architecture, S2-170880, SA WG2 Meeting #119, Feb. 13-17, 2017, Dubrovnik, Croatia, 8 pages.

* cited by examiner

INFORMATION CONFIGURATION METHOD AND MANAGEMENT UNIT

CROSS-REFERENCE TO RELATED APPLICATIONS

This application is a continuation of International Application No. PCT/CN2018/098392, filed on Aug. 2, 2018, which claims priority to Chinese Patent Application No. 201710660876.2, filed on Aug. 4, 2017 and claims priority to Chinese Patent Application No. 201710687514.2, filed on Aug. 11, 2017. The disclosures of the aforementioned applications are hereby incorporated by reference in their entireties.

TECHNICAL FIELD

Embodiments of the present invention relate to the communications field, and in particular, to an information configuration method and a management unit.

BACKGROUND

Network virtualization accelerates a development trend of network services. Compared with conventional communications services, operators have to face a more dynamically changing market and new differentiated requirements that emerge one after another. How to use existing network resources to quickly respond to a business-to-business (B2B) service requirement and a business-to-consumer (B2C) service requirement, and provide onboarding and provisioning of a new service in a timely manner is a main competition pressure faced by the operators.

Service orchestration can meet a service agility requirement: After a service request of a user is input into a service orchestrator, the service orchestrator automatically decomposes the service request, and finally decomposes the service request into creation requests and configuration data of a plurality of network elements, to orchestrate a network, and shorten time to market (TTM).

On the basis of supporting evolution of a current business model, a next generation network will be extended to support new different types of customers and partners. Operators will support vertical industries and promote a process of interaction between business and industries. A partnership will be built at a plurality of levels, including: sharing infrastructures, opening particular network functions, and integrating powerful and rich software capabilities of the partners into a next generation network system to provide end-to-end services. Flexibility and function embedding are very important to building a cooperative relationship at a plurality of layers. A network slice is an important technical means for the next generation network to meet special requirements of different industries and different users on the network.

In a conventional technical solution, as shown in FIG. 1, user equipment (UE) accesses (a registration request) an access network for the first time, and the access network (AN) forwards the corresponding registration request to a default access management function (AMF), the default AMF forwards the corresponding registration request to a network slice selection function (NSSF), the NSSF, the default AMF, or an NRF selects an AMF group based on the registration request, and returns an identifier of the selected access management function group to the AN, and the AN selects a specific AMF instance from the access management function group, and sends a session establishment request to the specific AMF instance.

However, a network usually includes a plurality of access management function groups, and in a conventional technical solution, how the NSSF, the default AMF, or the NRF selects an access management function group is not provided. Consequently, an access management function group may not be selected, or an access management function group selected by the NSSF, the default AMF, or the NRF does not meet a service requirement.

SUMMARY

Embodiments of the present invention provide an information configuration method and a management unit, to configure an association relationship between information about an access management function AMF group and network slice information for an NSSF, a default AMF, or an NRF, so that the NSSF, the default AMF, or the NRF can select an AMF group meeting a requirement of UE.

According to a first aspect, this application provides an information configuration method, including: determining, by a first management unit, an association relationship between information about an access management function AMF group and network slice information, where the association relationship is used to instruct (a first network unit, for example, an NSSF, a default AMF, or an NRF) to select the network slice information based on the information about the AMF group or select the information about the AMF group based on the network slice information; and then, sending, by the first management unit, a first message including the association relationship to the first network unit or a management unit of the first network unit; or storing, by the first management unit, the association relationship. In one embodiment, the first management unit may send the association relationship to the first network unit, and store the association relationship in the first management unit.

This application provides, in an embodiment, an information configuration method. The first management unit determines the association relationship between the information about the AMF group and the network slice information, and sends the determined association relationship between the information about the AMF group and the network slice information to the first network unit (for example, a network element) or the management unit (for example, an NSSMF configured to manage the network element) of the first network unit using the first message (for example, a configuration message or a network slice request message). The association relationship is used to instruct to select the network slice information based on the information about the AMF group or select the information about the AMF group based on the network slice information. Therefore, when a network includes a plurality of AMF groups, the association relationship determined by the first management unit enables a function unit (for example, when the first management unit is a network slice subnet management function (NSSMF) and the first network unit is the default AMF) for which the association relationship is finally configured to select a valid AMF group for a corresponding service request initiated by UE, so that the selected AMF group meets the service request of the UE.

In one embodiment, before the determining, by a first management unit, an association relationship between information about an access management function AMF group and network slice information, the method includes: receiving, by the first management unit, network requirement information (for example, network slice requirement information or network slice subnet requirement information); and the determining, by a first management unit, an association relationship between information about an access management function AMF group and network slice information includes: determining, by the first management unit, the association relationship between the information about the AMF group and the network slice information based on the network requirement information. In the design, the first management unit may associate existing network slice information with existing information about an AMF group based on the network requirement information; or create, based on the network requirement information, network slice information meeting a requirement, and associate the created network slice information with existing information about an AMF group that meets the network requirement information; or create, based on the network requirement information, information about an AMF group that meets a requirement, and associate the created information about the AMF group with existing network slice information meeting the network requirement information; or create, based on the network requirement information, an AMF group and a network slice that meet a requirement, and associate the created AMF group and network slice that meet the requirement. In this way, determining of the association relationship is triggered based on the network requirement information sent by a third party, so that the determined association relationship can meet the requirement of the UE.

In one embodiment, the determining, by a first management unit, an association relationship between information about an access management function AMF group and network slice information includes: receiving, by the first management unit, the association relationship between the information about the AMF group and the network slice information, to determine the association relationship between the information about the AMF group and the network slice information. The first management unit receives the association relationship sent by the third party, so that processing load of the first management unit can be alleviated. In the design, the first management unit may obtain the association relationship between the information about the AMF group and the network slice information using the third party (for example, a second management unit). For example, the first management unit may determine, in a configuration message sent by the third party, the association relationship between the information about the AMF group and the network slice information. This may be applicable to a network architecture in which the first management unit is an NSSMF and the second management unit is a network slice management function (NSMF).

In one embodiment, the information about the AMF group includes any one of the following: an identifier of the AMF group, an identifier of a management object of the AMF group, and a name of the AMF group. The identifier of the AMF group is used to identify the AMF group, and/or the identifier of the management object of the AMF group is used to identify the management object of the AMF group.

In one embodiment, the network slice information includes any one or more of the following: a network slice instance identifier, a network slice instance management object identifier, a network slice subnet instance identifier, a network slice subnet management object identifier, network slice selection assistance information S-NSSAI, a network slice type, a service type, a tenant identifier, and/or a public land mobile communications network (PLMN), where the tenant identifier is used to uniquely identify a tenant. Only some examples of content of the network slice information are listed above. In a specific implementation, alternatively, there may be other information than the foregoing listed information.

In one embodiment, the storing, by the first management unit, the association relationship includes any one of the following: configuring, by the first management unit, the network slice information in the AMF group or the management object of the AMF group; configuring, by the first management unit, the information about the AMF group in a network slice or a network slice management object; or configuring, by the first management unit, the information about the AMF group in a network slice subnet or a network slice subnet management object.

In one embodiment, the storing, by the first management unit, the association relationship includes any one of the following: configuring, by the first management unit, the network slice information in the AMF group or the management object of the AMF group; configuring, by the first management unit, the information about the AMF group in a network slice or a network slice management object; or configuring, by the first management unit, the information about the AMF group in a network slice subnet or a network slice subnet management object.

According to a second aspect, an embodiment of the present invention provides an information configuration method, including: determining, by a first management unit, at least one of an association relationship between information about an access management function AMF group and information about a first AMF and an association relationship between the information about the AMF group and network slice selection assistance information S-NSSAI, where the first AMF is at least one of a plurality of AMFs included in the AMF group; and sending, by the first management unit, a first message including the at least one association relationship to a second network unit (for example, a gNB); or storing, by the first management unit, the at least one association relationship. In this way, the second network unit (for example, a base station) for which the at least one association relationship is configured can determine an association relationship between the first AMF or the S-NSSAI and the access management function group. It may be understood that, the determining, by a first management unit, at least one of an association relationship between information about an access management function AMF group and information about a first AMF and an association relationship between the information about the AMF group and network slice selection assistance information S-NSSAI may be performed after determining the association relationship between the access management function AMF group and at least one of a plurality of pieces of network slice information described in the first aspect, or only the determining, by a first management unit, at least one association relationship may be performed. This is not limited in this application. In other words, the first management unit may determine only the association relationship between the access management function AMF group and the network slice information, or determine only the at least one of the association relationship between the information about the access management function AMF group and the information about the first AMF and the association relationship between the information about the AMF group and the S-NSSAI. Certainly, alternatively, the first management unit may determine both the association relationship between the information about the AMF group and the network slice information and the at least one of the association relationship between the information about the AMF group and the information about the first AMF and the association relationship between the AMF group and the S-NSSAI. In this way, not only a first network unit (for example, a network element) can select, based on the configured association relationship, an AMF group meeting a requirement of UE, but also the second network unit for which the at least one association relationship is configured can determine the association relationship between the AMF or the S-NSSAI and the access management function group.

This application provides an information configuration method. The first management unit (for example, the first management unit may be an NSSMF) determines the at least one of the association relationship between the information about the access management function AMF group and the information about the first AMF and the association relationship between the information about the AMF group and the S-NSSAI. Then, the first management unit sends the at least one association relationship to the second network unit (for example, the gNB). In an actual process, the second network unit does not have the at least one association relationship. Therefore, the at least one association relationship is configured for the second network unit, so that the second network unit can determine, based on the configured at least one association relationship, an AMF meeting the requirement of the UE, to forward service request information of the UE.

In one embodiment, before the determining, by a first management unit, at least one of an association relationship between information about an access management function AMF group and information about a first AMF and an association relationship between the information about the AMF group and network slice selection assistance information S-NSSAI, the method includes: receiving, by the first management unit, network requirement information (for example, network slice requirement information or network slice subnet requirement information); the determining, by a first management unit, at least one of an association relationship between information about an AMF group and information about a first AMF and an association relationship between the information about the AMF group and network slice selection assistance information S-NSSAI includes: determining, by the first management unit based on the network requirement information, the at least one of the association relationship between the information about the access management function AMF group and the information about the first AMF and the association relationship between the information about the AMF group and the network slice selection assistance information S-NSSAI. In the implementation, the first management unit may determine the at least one association relationship based on triggering of the network requirement information, so that when determining the at least one association relationship, the first management unit not only can associate existing information about an AMF group with existing network slice selection assistance information S-NSSAI, to determine the association relationship between the information about the AMF group and the network slice selection assistance information S-NSSAI and the association relationship between the existing information about the AMF group and the information about the first AMF group, but also when there is no information about an AMF group that meets the network requirement information, can create the information about the AMF group that meets the network requirement information, and associate the created information about the AMF group with at least one of the S-NSSAI and the information about the first AMF, or when there is no at least one of the first AMF and the S-NSSAI that meet the network requirement information, can create the first AMF and the S-NSSAI and associate the first AMF and the S-NSSAI with the information about the AMF group. Therefore, the second network unit for which the at least one association relationship is configured can more accurately select an AMF to forward the service request of the UE.

In one embodiment, the determining, by a first management unit, at least one of an association relationship between information about an access management function AMF group and information about a first AMF and an association relationship between the information about the AMF group and network slice selection assistance information S-NSSAI includes: receiving, by the first management unit, the at least one of the association relationship between the information about the AMF group and the information about the first AMF and the association relationship between the information about the AMF group and the S-NSSAI, to determine the at least one of the association relationship between the information about the AMF group and the information about the first AMF and the association relationship between the information about the AMF group and the network slice selection assistance information S-NSSAI. In this manner, the first management unit may associate, based on the at least one association relationship sent by a third party, an included AMF group with the first AMF or associate an included AMF group with the S-NSSAI.

In one embodiment, the determining, by a first management unit, at least one of an association relationship between information about an access management function AMF group and information about a first AMF and an association relationship between the information about the AMF group and network slice selection assistance information S-NSSAI includes: determining, by the first management unit, the S-NSSAI based on the information about the AMF group, and associating the determined S-NSSAI with the information about the AMF group; or determining the first AMF based on the information about the AMF group, and associating the determined first AMF with the information about the AMF group; or determining, by the first management unit, the information about the AMF group based on the first AMF, and associating the determined information about the AMF group with the first AMF; or determining, by the first management unit, the information about the AMF group based on the S-NSSAI, and associating the determined information about the AMF group with the S-NSSAI. In the implementation, the first management unit can autonomously determine the at least one of the association relationship between the information about the access management function AMF group and the information about the first AMF and the association relationship between the information about the AMF group and the network slice selection assistance information S-NSSAI.

In one embodiment manner, after the determining, by a first management unit, at least one of an association relationship between information about an access management function AMF group and information about a first AMF and an association relationship between the information about the AMF group and network slice selection assistance information S-NSSAI, the method provided in this embodiment of the present invention further includes sending, by the first management unit, a second message including the at least one association relationship to a second management unit when the first management unit determines that the second network unit does not belong to a management range of the first management unit, where the second management unit is configured to determine, based on the second message, a target management unit that configures the at least one association relationship for the second network unit. In an actual network architecture, the second network unit may not belong to the management range of the first management unit. Therefore, the at least one association relationship is sent to the second management unit, so that the second management unit can select the target management unit (it may be understood that the second management unit has an association between the target management unit and the second network unit) to configure, for the second network unit, at least one of an association relationship between the access management function AMF group and the first AMF and an association relationship between the access management function group and the network slice selection assistance information S-NSSAI, so that the second network unit can select an AMF meeting the requirement of the UE to forward the service request information of the UE.

In one embodiment, the first message further includes an association relationship between the information about the AMF group and network slice information. Therefore, before sending the first message, the first management unit further has the association relationship between the information about the AMF group and the network slice information. Both the at least one association relationship and the association relationship are sent in one information exchange. Therefore, a plurality of interactions between the first management unit and the second network unit can be reduced.

In one embodiment, the storing, by the first management unit, the at least one association relationship includes any one of the following: configuring, by the first management unit, the association relationship between the information about the AMF group and the S-NSSAI in the second network unit or a management object of the second network unit; or configuring, by the first management unit, the association relationship between the information about the AMF group and the information about the first AMF in the second network unit or a management object of the second network unit.

Correspondingly, this application further provides an information configuration apparatus. The apparatus may implement the information configuration method described in the first aspect or the second aspect. For example, the apparatus may be a management unit, and may implement the foregoing information configuration method using software or hardware, or using hardware executing corresponding software.

In one embodiment, the apparatus (namely, the management unit) may include a processor and a memory. The processor is configured to support the apparatus in performing a corresponding function in the method according to the first aspect. The memory is configured to couple to the processor, and stores a necessary program instruction and necessary data of the apparatus. In addition, the apparatus may further include a communications interface, configured to support communication between the apparatus and another network element. The communications interface may be a transceiver.

Specifically, in one embodiment, the management unit includes: a memory, a processor, a bus, and a transceiver. The memory stores code and data, the processor is connected to the memory using the bus, and the processor runs the code in the memory, to enable the management unit to perform the information configuration method described in any one of the first aspect and the possible design manners of the first aspect or any one of the second aspect and the possible design manners of the second aspect.

According to a third aspect, an embodiment of the present invention provides a management unit, including a determining unit and a sending unit. The determining unit is configured to determine an association relationship between information about an access management function AMF group and network slice information, where the association relationship is used to instruct to select the network slice information based on the information about the AMF group or select the information about the AMF group based on the network slice information; and the sending unit is configured to send a first message including the association relationship between the information about the AMF group and the network slice information to a first network unit; or a storage unit is configured to store the association relationship.

In one embodiment, the first management unit further includes a receiving unit, configured to receive network requirement information, where the determining unit is specifically configured to determine the association relationship between the information about the AMF group and the network slice information based on the network requirement information.

In one embodiment, the determining unit is specifically configured to determine the association relationship between the information about the AMF group and the network slice information based on the association relationship that is received by the receiving unit and that is between the information about the AMF group and the network slice information.

In one embodiment, the information about the AMF group includes any one of the following: an identifier of the AMF group, an identifier of a management object of the AMF group, and/or a name of the AMF group.

In one embodiment, the network slice information includes any one or more of the following: a network slice instance identifier, a network slice instance management object identifier, a network slice subnet instance identifier, a network slice subnet management object identifier, network slice selection assistance information S-NSSAI, a network slice type, a service type, a tenant identifier, and/or a public land mobile communications network PLMN.

In one embodiment, the storage unit is specifically configured to perform any one of the following: configuring the network slice information in the AMF group or the management object of the AMF group; configuring the information about the AMF group in a network slice or a network slice management object; or configuring the information about the AMF group in a network slice subnet or a network slice subnet management object.

According to a fourth aspect, an embodiment of the present invention provides a first management unit, including: a determining unit, configured to determine at least one of an association relationship between information about an access management function AMF group and information about a first AMF and an association relationship between the information about the AMF group and network slice selection assistance information S-NSSAI, where the first AMF is at least one of a plurality of AMFs included in the AMF group; and a sending unit, configured to send a first message including the at least one association relationship to a second network unit; or a storage unit, configured to store the at least one association relationship.

In one embodiment, the first management unit further includes a receiving unit, configured to receive network requirement information, where the determining unit is specifically configured to determine, based on the network requirement information, the at least one of the association relationship between the information about the access management function AMF group and the information about the first AMF and the association relationship between the information about the AMF group and the network slice selection assistance information S-NSSAI.

In one embodiment, the determining unit provided in this embodiment of the present invention is specifically configured to determine the at least one of the association relationship between the information about the AMF group and the information about the first AMF and the association relationship between the information about the AMF group and the network slice selection assistance information S-NSSAI based on the at least one association relationship that is received by the receiving unit and that is in the association relationship between the information about the AMF group and the information about the first AMF and the association relationship between the information about the AMF group and the S-NSSAI.

In one embodiment, the determining unit is further configured to: when determining that the second network unit does not belong to a management range of the first management unit, send, to a second management unit using the sending unit, a second message including the at least one of the association relationship between the information about the access management function AMF group and the information about the first AMF and the association relationship between the information about the AMF group and the network slice selection assistance information S-NSSAI, where the second management unit is configured to determine, based on the second message, a target management unit that configures the at least one association relationship for the second network unit.

In one embodiment, the first message further includes: at least one of an association relationship between the access management function group and each of one or more AMFs included in the access management function group and an association relationship between the access management function group and the network slice selection assistance information S-NSSAI.

In one embodiment, the storage unit is specifically configured to perform any one of the following: configuring the association relationship between the information about the AMF group and the S-NSSAI in a management object of the second network unit; or configuring, the association relationship between the information about the AMF group and the information about the first AMF in a management object of the second network unit.

In one embodiment, a structure of the apparatus includes a processing module and a communications module. The processing module is configured to support the first management unit in performing a corresponding function in the foregoing method. The communications module is configured to support communication between the first management unit and another network element (the first network unit) or a management unit (for example, the second management unit or a third management unit). The first management unit may further include a memory. The memory is configured to couple to the processing module, and stores a necessary program instruction and necessary data of the first management unit.

According to a fifth aspect, an embodiment of the present invention provides a management unit, including: a memory, a processor, a bus, and a communications interface. The memory stores code and data, the processor is connected to the memory using the bus, and the processor is configured to determine an association relationship between information about an access management function AMF group and network slice information, where the association relationship is used to instruct to select the network slice information based on the information about the AMF group or select the information about the AMF group based on the network slice information; and the communications interface is configured to send a first message including the association relationship to a first network unit; or the processor is configured to store the association relationship in the memory.

In one embodiment, the communications interface is further configured to receive network requirement information; and the processor is specifically configured to determine the association relationship between the information about the AMF group and the network slice information based on the network requirement information.

In one embodiment, the processor is specifically configured to determine the association relationship between the information about the AMF group and the network slice information based on the association relationship that is received by the communications interface and that is between the information about the AMF group and the network slice information.

In one embodiment, the information about the AMF group includes any one of the following: an identifier of the AMF group, an identifier of a management object of the AMF group, and/or a name of the AMF group.

In one embodiment, the network slice information includes any one or more of the following: a network slice instance identifier, a network slice instance management object identifier, a network slice subnet instance identifier, a network slice subnet management object identifier, network slice selection assistance information S-NSSAI, a network slice type, a service type, a tenant identifier, and/or a public land mobile communications network PLMN.

In one embodiment, that the processor is configured to store the association relationship in the memory includes any one of the following: The processor is specifically configured to configure the network slice information in the AMF group or the management object of the AMF group; the processor is specifically configured to configure the information about the AMF group in a network slice or a network slice management object; or the processor is specifically configured to configure the information about the AMF group in a network slice subnet or a network slice subnet management object.

According to a sixth aspect, an embodiment of the present invention provides a first management unit, including: a memory, a processor, a bus, and a communications interface. The memory stores code and data, the processor is connected to the memory using the bus, and the processor is configured to determine at least one of an association relationship between information about an access management function AMF group and information about a first AMF and an association relationship between the information about the AMF group and network slice selection assistance information S-NSSAI, where the first AMF is at least one of a plurality of AMFs included in the AMF group; and the communications interface is configured to send a first message including the at least one association relationship to a second network unit; or the processor is configured to store the at least one association relationship in the memory.

In one embodiment, the communications interface is further configured to receive network requirement information; and the processor is specifically configured to determine, based on the network requirement information, the at least one of the association relationship between the information about the access management function AMF group and the information about the first AMF and the association relationship between the information about the AMF group and the network slice selection assistance information S-NSSAI.

In one embodiment, the processor is specifically configured to determine the at least one of the association relationship between the information about the AMF group and the information about the first AMF and the association relationship between the information about the AMF group and the network slice selection assistance information S-NSSAI based on the at least one association relationship that is received by the communications interface and that is in the association relationship between the information about the AMF group and the information about the first AMF and the association relationship between the information about the AMF group and the S-NSSAI.

In one embodiment, the processor is further configured to: when determining that the second network unit does not belong to a management range of the first management unit, send a second message including the at least one association relationship to a second management unit using the communications interface, where the second management unit is configured to determine, based on the second message, a target management unit that configures the at least one association relationship for the second network unit.

In one embodiment, that the first management unit stores the at least one association relationship includes any one of the following: The processor is specifically configured to configure the association relationship between the information about the AMF group and the S-NSSAI in the second network unit or a management object of the second network unit; or the processor is specifically configured to configure the association relationship between the information about the AMF group and the information about the first AMF in the second network unit or a management object of the second network unit.

According to another aspect, an embodiment of the present invention provides a network management system. The system includes the apparatus that is described in the foregoing aspect and that may implement a function of the first management unit, and the apparatus that is described in the foregoing aspect and that may implement a function of the second management unit.

According to a seventh aspect, an embodiment of the present invention provides a computer readable storage medium. The computer readable storage medium stores a computer program, and when the program is run on a management unit, the information configuration method described in any one of the first aspect and the possible designs of the first aspect is performed.

According to an eighth aspect, an embodiment of the present invention provides a computer readable storage medium. The computer readable storage medium stores a computer program, and when the program is run on a management unit, the information configuration method described in any one of the second aspect and the possible designs of the second aspect is performed.

According to a ninth aspect, an embodiment of the present invention provides a computer program product. When the computer program product is run on a computer, the computer is enabled to perform the information configuration method described in any one of the first aspect and the possible designs of the first aspect.

According to a tenth aspect, an embodiment of the present invention provides a computer program product. When the computer program product is run on a computer, the computer is enabled to perform the information configuration method described in any one of the second aspect and the possible designs of the second aspect.

According to an eleventh aspect, an embodiment of the present invention provides an information selection method, including: receiving, by a first network unit, a registration request sent by an access network (AN), where association relationships between a plurality of access management function groups and network slice information corresponding to the access management function groups are configured in the first network unit; determining, by the first network unit based on the registration request and the association relationships between the plurality of access management function groups and the network slice information corresponding to the access management function groups, information about an access management function group associated with network slice information meeting the registration request; and sending, by the first network unit to the AN, the information about the access management function group associated with the network slice information meeting the registration request.

According to a twelfth aspect, an embodiment of the present invention provides an information configuration method, including: receiving, by a first management unit (for example, an NSSMF), a first message sent by a second management unit (for example, an NSMF), where the first message includes an association relationship between an access management function AMF group and network slice information, and the association relationship is used to instruct to select, from a plurality of network slice based on information about the AMF group, a network slice indicated by the network slice information, or select, from a plurality of AMF groups based on the network slice information, an AMF group indicated by information about the AMF group; and sending, by the first management unit, the association relationship between the access management function AMF group and the network slice information to a first network unit; or storing, by the first management unit, the association relationship.

According to a thirteenth aspect, an embodiment of the present invention provides an information configuration method, including: receiving, by a first management unit (for example, an NSSMF) a first message sent by a second management unit (for example, an NSMF), where the first message includes at least one of an association relationship between an access management function AMF group and each of one or more AMFs included in the access management function AMF group and an association relationship between the access management function group and network slice selection assistance information S-NSSAI; sending, by the first management unit to a second network unit, the at least one of the association relationship between the access management function AMF group and each of the one or more AMFs included in the access management function AMF group and the association relationship between the access management function group and the network slice selection assistance information S-NSSAI; or storing, by the first management unit, the at least one association relationship.

It may be understood that any apparatus, any computer storage medium, or any computer program product provided above is configured to perform a corresponding method provided above. Therefore, for beneficial effects that can be achieved by any apparatus, any computer storage medium, or any computer program product, refer to beneficial effects of a corresponding solution in a specific implementation provided above. Details are not described herein again.

DESCRIPTION OF EMBODIMENTS

Before an information configuration method and a management unit provided in this application are described, some terms in this application are first described:

A network slice (NS) is a communications resource ensuring that a bearer service can meet a requirement of a service level specification (SLS), or may be considered as a combination of a network function and a communications resource that are required to complete a service or some services. Hard isolation (physical isolation) or soft isolation (logical isolation) may be performed on these resources based on different requirements. It may be considered that a network slice is a combination of a network function and a resource that are required to complete a service (or some services), and is a complete logical network.

A service is a communications service that is of a specified SLR and that is available to a group of users, for example, a mobile broadband (MBB) service, a voice service, or an Internet of things (IOT) service such as an intelligent parking service or an intelligent meter reading service.

An end-to-end (E2E) network slice refers to an entire system, including a core network (CN) and a radio access network (RAN).

A tenant is a renter of a carrier network. For example, an electric power company rents a network of a carrier to deploy an intelligent meter reading service, and in this case, the electric power company may be a tenant of the carrier.

Network architectures and service scenarios described in this application are intended to describe technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

Figure 1:
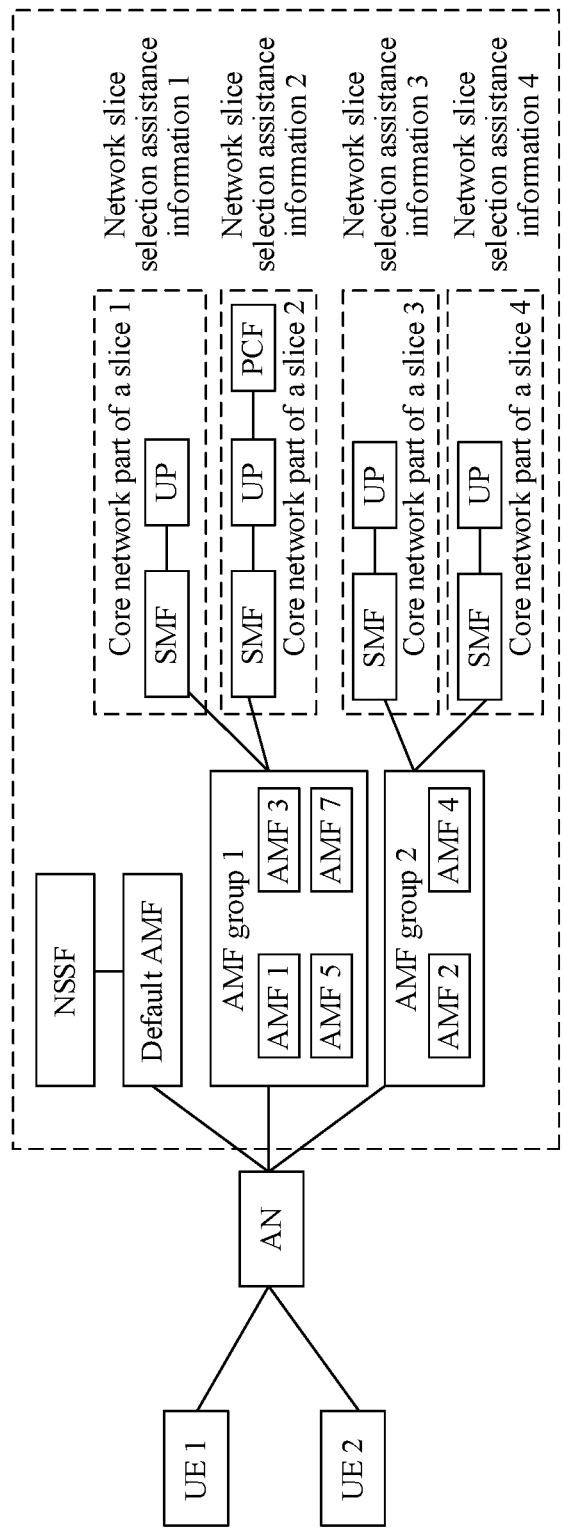
FIG. 1 is a schematic diagram of a network architecture in the prior art.
Figure 2:
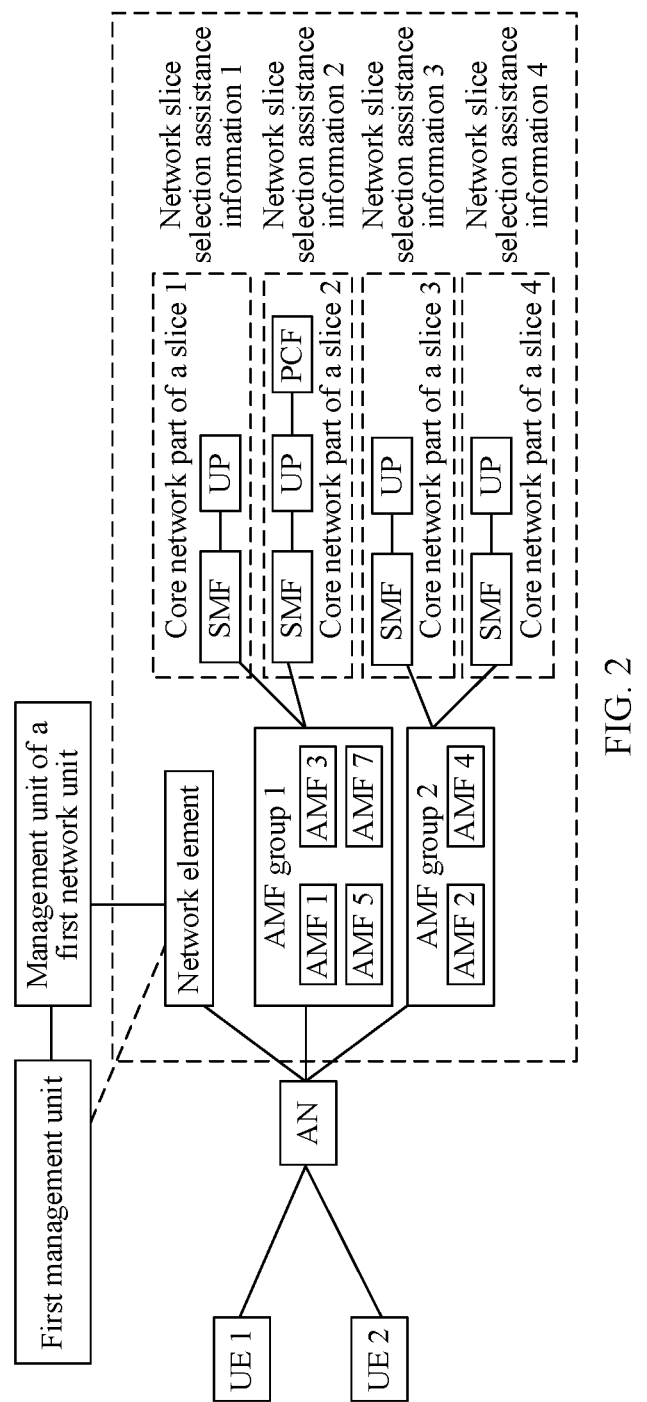
FIG. 2 is a schematic diagram 1 of a network architecture according to an embodiment of the present invention.
Figure 3:
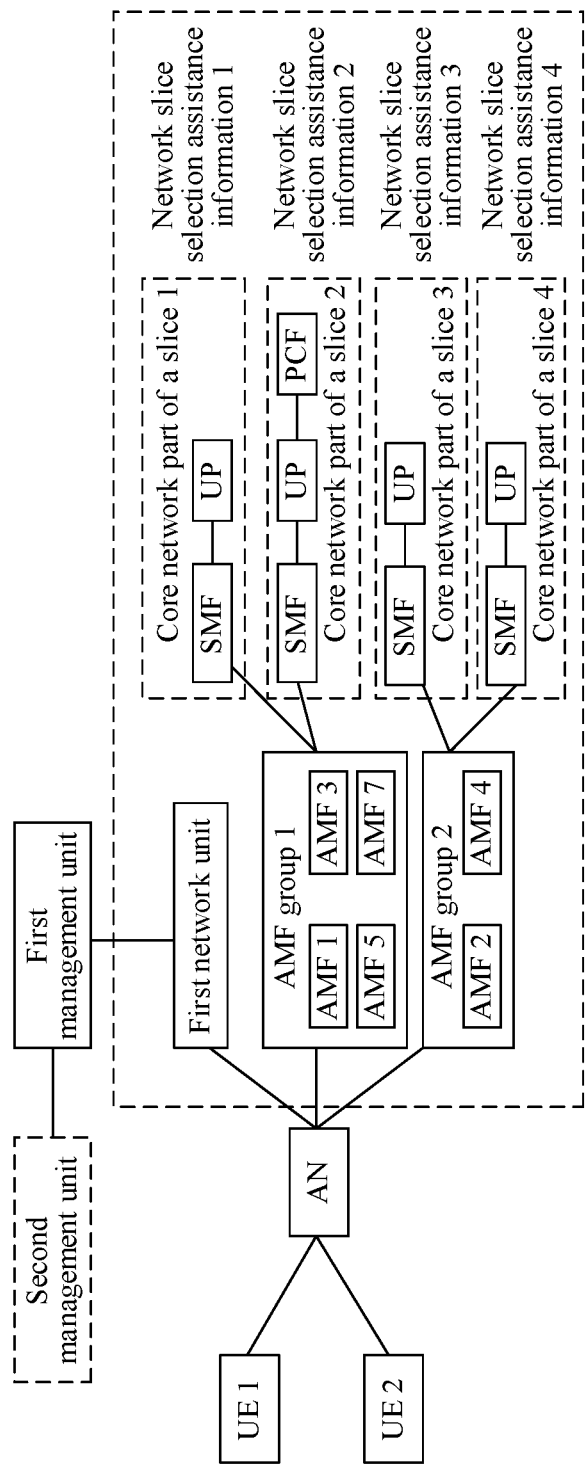
FIG. 3 is a schematic diagram 2 of a network architecture according to an embodiment of the present invention.

The technical solutions provided in this application may be applied to a network management system. Based on a network architecture shown in FIG. 1, a logical unit is introduced into the solutions in this application. Specifically, as shown in FIG. 2, a first management unit and a management unit of a first network unit are introduced. Alternatively, based on the network structure shown in FIG. 1, a first management unit, a first network unit that may be understood as a network element shown in FIG. 3, a second management unit, and a second network unit (not shown in FIG. 3) are introduced into this application. A specific architecture is shown in FIG. 3.

In one embodiment, the first management unit may be a network slice management unit (NSMF) or a network slice subnet management function (NSSMF). For example, in an architecture shown in FIG. 2, the first management unit is an NSMF, and in the architecture shown in FIG. 3, the first management unit is an NSSMF.

In conclusion, the first management unit may be an NSMF and an NSSMF, the first network unit may be an NSSF, a default AMF, or an NRF, the management unit of the first network unit may be an NSSMF, the second network unit may be a network device, for example, a gNB, and a management unit of the second network unit may be an NSSMF.

Specifically, as shown in FIG. 2, when the first management unit is an NSMF, the NSMF may send an association relationship to the first network unit (for example, the network element) or the management unit (for example, the NSSMF) of the first network unit.

As shown in FIG. 3, when the first management unit is an NSSMF, the NSSMF may send an association relationship to the first network unit (for example, the network element).

Similarly, when the first management unit is an NSMF, the NSMF may send at least one association relationship to the second network unit or the management unit of the second network unit.

When the first management unit is an NSSMF, the NSSMF may send at least one association relationship to the second network unit.

In embodiments of this application, the first network unit may be a network element. The management unit of the first network unit is configured to manage the first network unit, and may be, for example, a subnet slice management unit NSSMF. The first network unit may be a network element, for example, at least one of a network slice selection function (NSSF), a network function repository function (NRF), or a default AMF. Specifically, functions of the first network unit in different architectures are different. The following provides descriptions with reference to specific embodiments.

In embodiments of this application, the network slice management unit may be configured as an independent function entity, or the network slice management unit may be configured as a function module of another function entity, or a function of the network slice management unit may be integrated into another function entity. Similarly, in embodiments of this application, the subnet slice management unit may be configured as an independent function entity, or the subnet slice management unit may be configured as a function module of another function entity, or a function of the subnet slice management unit may be integrated into another function entity. Further, the network slice management unit and the subnet slice management unit may be integrated into an integrated entity, and the integrated entity has a function of the network slice management unit and a function of the subnet slice management unit. For example, the integrated entity may be referred to as a service and network orchestration unit. It may be understood that the integrated entity may alternatively have another name, and this is not limited in this application. Similarly, in the case of the integrated entity, the integrated entity may be configured as an independent function entity, or the integrated entity may be configured as a function module of another function entity, or functions of the integrated entity may be integrated into another function entity.

The network slice management unit includes but is not limited to receiving a network slice instance (NSI) request message. The NSI request message carries NSI network requirement information. Specifically, a communications service provider (CSP) of a tenant sends a service request message to a communication service management function (CSMF) of the tenant, and the service request message carries (service requirement information). After the CSMF receives the service request message, the CSMF converts a service requirement into a network requirement. A network management unit configures an association relationship between an access management function (AMF) group (the access management function group may also be referred to as a mobility management unit group, that is, an AMF group) and network slice information, sends an association relationship between information about the AMF group and the network slice information to a subnet slice management unit or a network element, associates the information about the AMF group with information about one or more AMFs included in the AMF group, to obtain an association relationship between the information about the AMF group and information about each AMF, associates the information about the AMF group with S-NSSAI, and sends, to the NSSMF, the obtained association relationship between the information about the AMF group and the information about each AMF and the obtained association relationship between the information about the AMF group and the S-NSSAI. In addition, the NSMF is further configured to convert the network requirement information into subnet requirement information, and send the subnet requirement information to the NSSMF, so that the NSSMF determines, based on the subnet requirement information, the association relationships between the information about the AMF group and the information about one or more AMFs included in the AMF group, determines, based on the network requirement information, the association relationship between the network slice information (which may also be referred to as AMF group selection information) and the information about the AMF group, and determines the association relationship between the information about the AMF group and the S-NSSAI.

The subnet slice management unit includes but is not limited to: receiving a first message that is sent by the NSMF and that carries the association relationship between the network slice information and the access management function group, configuring the association relationship between the network slice information and the information about the access management function group for the first network unit (for example, a network element) or determining the association relationship between the information about the access management function group and the network slice information based on the subnet requirement information sent by the NSMF, determining the association relationship between the information about the access management function group and the information about each of one or more AMFs included in the access management function group and the association relationship between the information about the access management function group and the S-NSSAI, configuring the association relationship between the network slice information and the information about the access management function group for the first network unit, and configuring, for the second network unit (for example, a network device may be a next generation NodeB (gNB), the association relationship between the information about the access management function group and the information about each AMF and the association relationship between the information about the access management function group and the network slice information.

In one embodiment, the network element includes at least one of an NSSF, an NRF, and a default AMF.

The NSSF is configured to: store an association relationship between each of one or more access management function groups and corresponding network slice information; and when receiving a registration request of UE that is forwarded by the default AMF, select, based on requirement information carried in the registration request, an access management function group meeting the registration request, and forward information about the access management function group meeting the registration request to an AN using the default AMF. In addition, the NSSF is further configured to store an association relationship between each of a plurality of access management function groups and one or more AMFs included in the access management function group, and an association relationship between each access management function group and corresponding S-NSSAI.

The NRF is configured to store and discover NF information (for example, information about an NF instance, slice information of the NF instance, and slice selection assistance information corresponding to the NF instance) in a service-oriented network architecture.

The default AMF is configured to authenticate and authorize user equipment, and manage mobility of the user equipment. Certainly, both the NRF and the default AMF may be configured to store the association relationship between each of the plurality of access management function groups and corresponding network slice information, the association relationship between each of the plurality of access management function groups and one or more AMFs included in the access management function group, and the association relationship between each of the plurality of access management function groups and corresponding S-NSSAI.

The network device may be a base station. The association relationship between each access management function group and each AMF included in the access management function group is configured for the gNB, so that the gNB can select, based on the configured association relationship between each access management function group and each AMF included in the access management function group, an AMF meeting a requirement of UE, to forward service request information of the UE.

FIG. 2 and FIG. 3 are several possible schematic diagrams of a network architecture according to this application. In the several possible architecture diagrams, functions of an AN, an SMF, and an NSSF are the same as functions of those in FIG. 1. For details, refer to descriptions in FIG. 1. Details are not described subsequently. The following describes a setting status of an NSMF and an NSSMF in the network architectures shown in FIG. 2 and FIG. 3.

Specifically, when the method is applied to the network architecture shown in FIG. 2, a first management unit may be an NSMF, and a management unit of the first network unit may be an NSSMF. In FIG. 2, the NSMF may directly configure an association relationship between information about an AMF group and network slice information for a network element.

When the method is applied to the network architecture shown in FIG. 3, a first management unit may be an NSSMF, and a first network unit may be at least one of an NSSF, an NRF, and a default AMF. A second management unit may be an NSMF, and a second network unit may be an NF.

It should be noted that the NSMF may alternatively be a network management (NM) unit. The NSSMF may configure, for the NSSF, the NRF, or the default AMF, an association relationship between information about an AMF group and network slice information using an element management (EM) unit or a network function management (NFM) unit.

Certainly, when the method is applied to the network architecture shown in FIG. 3, the first management unit may be an NSSMF, the first network unit may be at least one of an NSSF, an NRF, or a default AMF, and the second management unit may be an NSMF. In other words, the NSSMF may directly configure an association relationship between an access management function group and network slice information for at least one of the NSSF, the NRF, and the default AMF.

Figure 4:
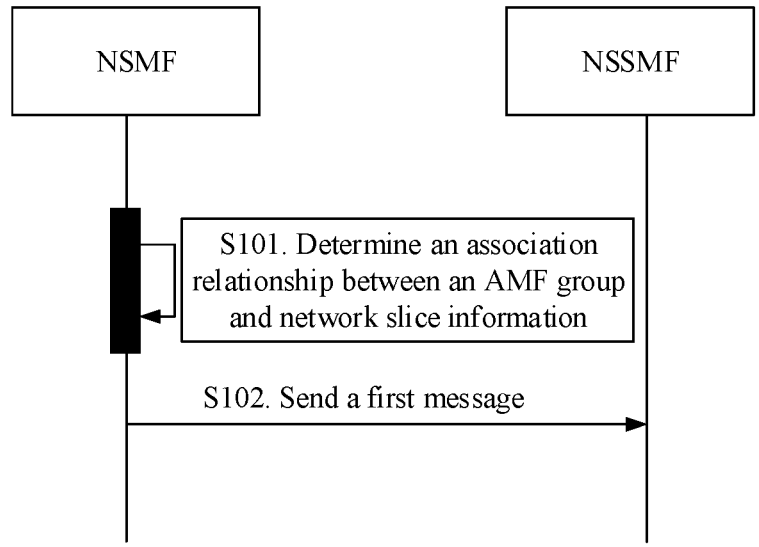
FIG. 4 is a schematic flowchart 1 of an information configuration method according to an embodiment of the present invention.
Figure 5:
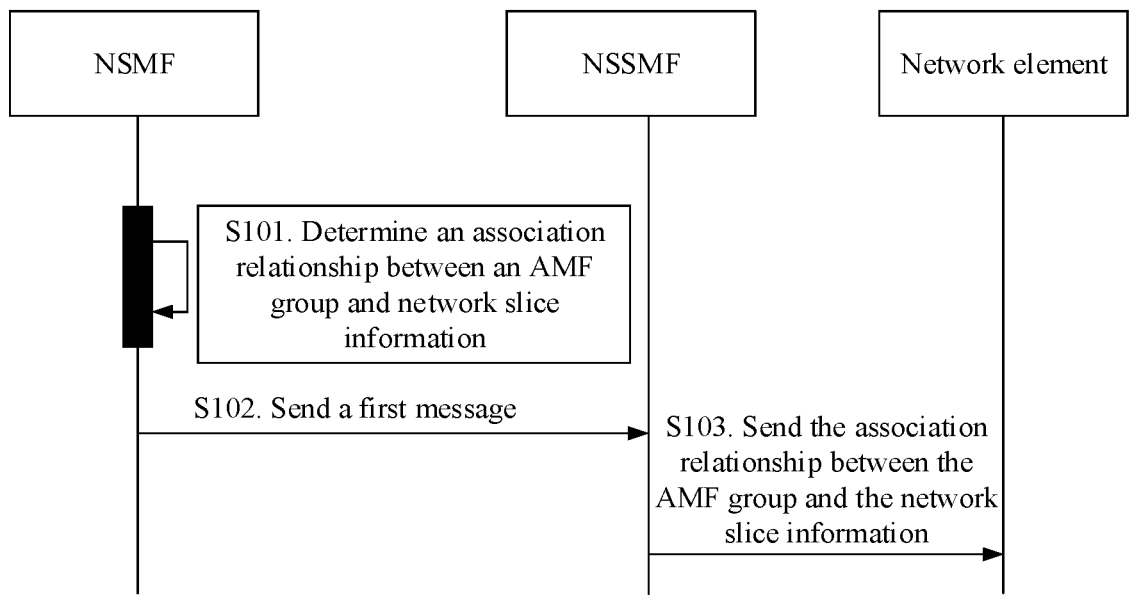
FIG. 5 is a schematic flowchart 2 of an information configuration method according to an embodiment of the present invention.
Figure 6:
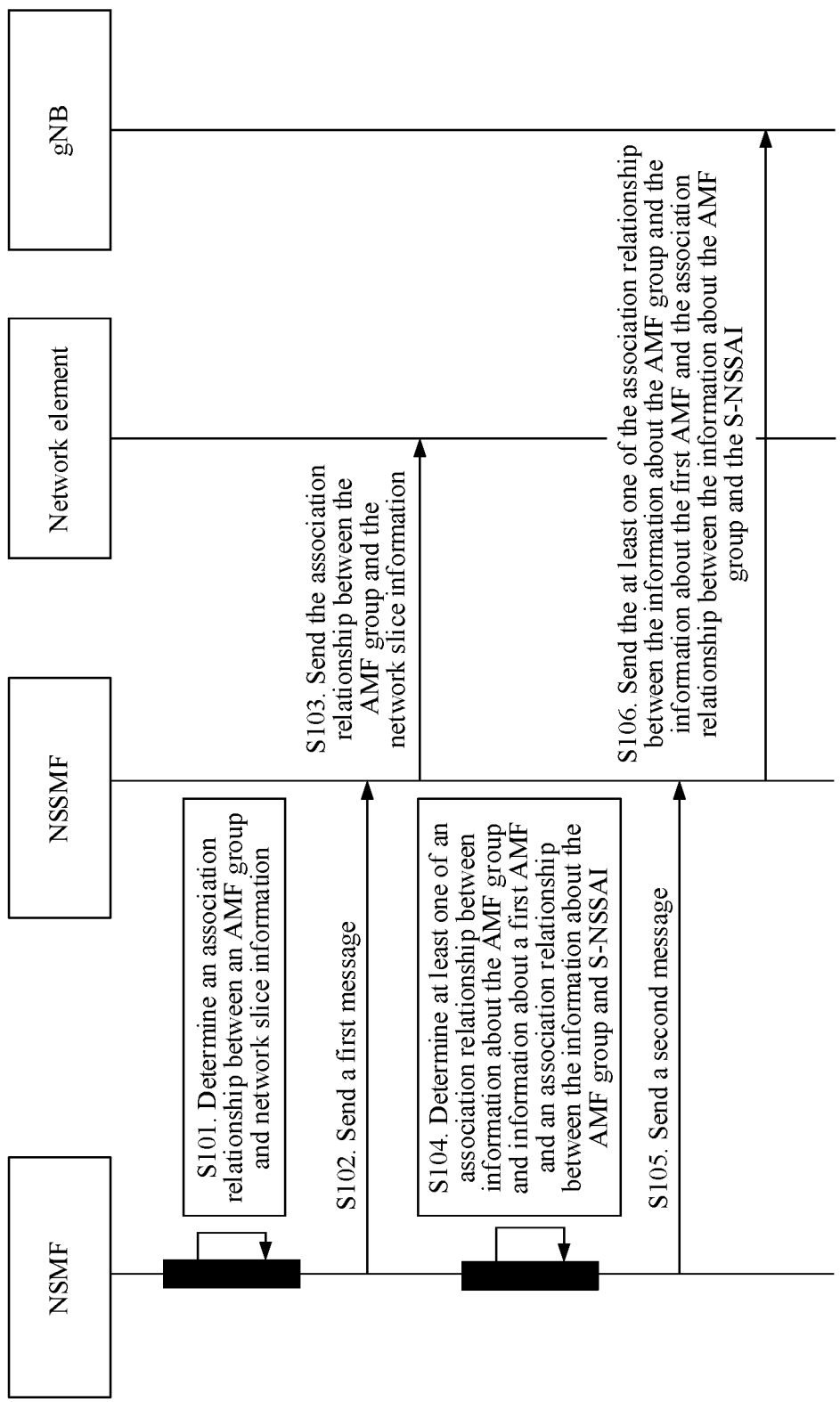
FIG. 6 is a schematic flowchart 3 of an information configuration method according to an embodiment of the present invention.

The following further describes the solutions provided in this application with reference to FIG. 4 to FIG. 6.

FIG. 4 is a schematic flowchart of an information configuration method according to this application. The method shown in FIG. 4 may be applied to the network architecture shown in FIG. 2. As shown in FIG. 4, an information configuration method provided in an embodiment of this application includes the following operations.

Operation S101. An NSMF determines an association relationship between information about an AMF group and network slice information, where the association relationship is used to instruct to determine, in a plurality of network slices based on the information about the AMF group, a network slice indicated by the network slice information, or determine, in a plurality of AMF groups based on the network slice information, the AMF group indicated by the information about the AMF group.

In one embodiment, the information about the access management function AMF group is information about at least one of a plurality of access management function AMF groups. The network slice information is at least one of a plurality of pieces of network slice information.

In this embodiment of the present invention, the information about the AMF group may be an identifier of an AMF group or an identifier of a management object of the AMF group. For example, the identifier of the AMF group may be a name or a product number of the AMF group, and the identifier of the management object of the AMF group may be a name or a product number of the management object of the AMF group.

In one embodiment, the network slice information includes any one or more of the following: a network slice instance identifier, a network slice instance management object identifier, a network slice subnet instance identifier, a network slice subnet management object identifier, network slice selection assistance information S-NSSAI, a network slice type, a service type, a tenant identifier, and/or a public land mobile communications network PLMN. The network slice instance identifier is used to identify a network slice instance, the network slice instance management object identifier is used to identify a network slice instance management object, and the tenant identifier is used to identify a tenant.

In a possible implementation, the NSMF may associate the identifier of the access management function AMF group with the network slice information, to use the association as the association relationship between the information about the access management function AMF group and the network slice information.

The access management function group and the network slice information may meet a same service requirement. When there are a plurality of pieces of network slice information, information about one AMF group may be further associated with two or more pieces of network slice information. In other words, in this case, the network slice information may be two or more of at least two pieces of network slice information.

It may be understood that the association relationship between the AMF group and the network slice information may also be referred to as network slice selection assistance information.

S102. The NSMF sends a first message to an NSSMF, where the first message includes the association relationship between the AMF group and the network slice information, and the NSSMF is configured to configure the association relationship between the AMF group and the network slice information for a network element.

In one embodiment, the first message may be a configuration message, a slice request message, or a network request message.

Alternatively, in one embodiment, the NSMF stores the association relationship. Specifically, that the NSMF stores the association relationship includes any one of the following: The NSMF configures the network slice information in the AMF group or the management object of the AMF group; the NSMF configures the information about the AMF group in a network slice or a network slice management object; and/or the NSMF configures the information about the AMF group in a network slice subnet or a network slice subnet management object.

This application provides an information configuration method. The first management unit determines the association relationship between the information about the AMF group and the network slice information, and sends the determined association relationship between the information about the AMF group and the network slice information to a first network unit or a management unit of a first network unit using the first message (for example, the configuration message or the network slice request message). The association relationship is used to instruct to select the network slice information based on the information about the AMF group or select the information about the AMF group based on the network slice information. Therefore, when a network includes a plurality of AMF groups, the association relationship determined by the first management unit may enable the first network unit (for example, when the first management unit is a Network Slice Subnet Management Function (NSSMF) and the first network unit is a default AMF) for which the association relationship is finally configured to select a valid AMF group for a corresponding service request initiated by UE, so that the selected AMF group meets the service request of the UE.

The network element may be at least one of an NSSF, an NRF, and a default AMF.

To enable the network element to determine, based on the service request of the UE, the AMF group meeting a service requirement of the UE, as shown in FIG. 5, in one embodiment, the method further includes the following operations.

Operation S103. The NSSMF sends the association relationship between the information about the AMF group and the network slice information to the network element.

It may be understood that, a process in which the NSSMF configures the association relationship between the information about the AMF group and the network slice information for the network element may be implemented using operation S103. In this way, when receiving a registration request of the UE, the network element may determine, based on the configured association relationship, the access management function group meeting the requirement of the UE. Compared with the prior art in which the network element randomly selects an AMF group when receiving the registration request of the UE, this application enables the selected AMF group to meet the requirement of the UE.

In an actual process, the NSMF may have an access management function group and network slice information, but does not have an association relationship between the access management function group and the network slice information. Alternatively, the NSMF has an access management function group meeting the service requirement, but does not have network slice information meeting the service requirement. In this case, the network slice information meeting the service requirement needs to be created. Alternatively, the NSMF may not have network slice information and network slice information that meet the service requirement. Because the foregoing scenarios are different in specific implementations, the following describes the scenarios.

In one embodiment, in a possible implementation, operation S101 may be implemented in the following manner:

Operation S1011. The NSMF associates one AMF group (for example, a first AMF group) of at least one access management function group with one piece of network slice information (for example, first network slice information) of at least one piece of network slice information, to determine the association relationship between the information about the AMF group and the network slice information. In this way, the NSMF can determine to associate an existing AMF group with corresponding network slice information.

Specifically, the NSMF may associate AMF groups that are of a same type or that meet a same service requirement with one of the at least one piece of network slice information.

In a possible implementation, the NSMF associates an identifier of an AMF group with one piece of network slice information that corresponds to the AMF group and that is in the at least one piece of network slice information, to determine the association relationship between the AMF group and the network slice information.

In a possible implementation, operation S1011 in this application may be implemented in the following manner:

Operation S1011a. The NSMF determines the first network slice information in the at least one piece of network slice information based on the information about the AMF group, and associates the determined first network slice information with the information about the AMF group, to determine the association relationship between the information about the AMF group and the network slice information.

In the implementation, the NSMF may have the network slice information and the AMF group, or may have only the AMF group. In this way, the NSMF may determine the corresponding first network slice information based on the existing information about the AMF group, to determine the association relationship between the access management function group and the network slice information.

In a possible implementation, operation S1011 may be implemented in the following manner:

Operation S1011b. The NSMF determines information about a first AMF group (the information about the first access management function group may be an identifier of the first access management function group) in at least one AMF group based on one piece of network slice information (for example, the first network slice information) in the at least one piece of network slice information, associates the determined first AMF group with the piece of network slice information in the at least one piece of network slice information, to determine the association relationship between the first AMF group and the piece of network slice information in the at least one piece of network slice information.

Operation S1011 is implemented using operation S1011a or operation S1011b, so that the NSMF can flexibly determine the association relationship between the first network slice information and the first AMF group.

In the implementation, the NSMF may have the network slice information and the AMF group, or may have only the network slice information. In this way, the NSMF may determine, based on the included network slice information, AMF groups that implement a same service, to determine the association relationship between the information about the AMF group and the network slice information.

In one embodiment, in another possible implementation, operation S101 may be implemented in the following manner:

Operation S1012. The NSMF receives network requirement information, where the network requirement information includes network slice requirement information or network slice subnet requirement information.

As described above, the network requirement information may be sent by a CSMF to the NSMF.

Operation S1013. The NSMF determines the association relationship between the network slice information and the information about the AMF group based on the network requirement information.

Specifically, operation S1013 may be implemented in the following manner:

Operation S1013a. The NSMF obtains, based on the network requirement information, network slice information and information about an AMF group that meet the network requirement information.

Operation S1013b. The NSMF associates the network slice information and the information about the AMF group that meet the network requirement information, to determine the association relationship between the network slice information and the information about the AMF group.

In an implementation, the NSMF may have the information about the AMF group that meets the network requirement information, may have the network slice information meeting the network requirement information, or may not have the network slice information meeting the network requirement information. Therefore, operation S1013a may be implemented in the following manner:

Operation S1013a1. If the NSMF determines that the at least one piece of network slice information includes the first network slice information, and the first network slice information meets the network requirement information, the NSMF associates the first network slice information with the information about the AMF group that meets the network requirement information, to determine the association relationship between the network slice information and the information about the AMF group. One of the at least one piece of existing network slice information is associated with the existing information about the AMF group that meets the network requirement information, so that flexible resource configuration can be implemented.

In an actual process, two or more pieces of network slice information may carry a same service of an AMF group indicated by one piece of information about the AMF group. Therefore, the network slice information in an embodiment of this application includes two or more pieces of network slice information. For example, one piece of information about an AMF group may be associated with slice instances used to implement a service A, and the information about the AMF group may be associated with a slice type used to implement the service A.

Alternatively, in S1013a2, if the NSMF determines that the at least one piece of network slice information does not include the network slice information meeting the network requirement information, the NSMF creates, based on the network requirement information, the network slice information meeting the network requirement information, and associates the newly created network slice information with AMF group selection information, to determine the association as the association relationship between the information about the AMF group and the network slice information. When the existing network slice information does not include the network slice information meeting the network requirement information, new network slice information is created, and the newly created network slice information is associated with an existing AMF group. In this way, each AMF group in the first management unit can have corresponding network slice information, so that an association relationship between each AMF group and network slice information associated with the AMF group can be configured (using the NSSMF) for the network element in time, so that the network element can determine, based on the configured association relationship, information about an AMF group meeting the requirement of the UE.

In still another possible implementation, the at least one piece of network slice information in the NSMF includes the network slice information meeting the network requirement information, but the at least one access management function group does not include an access management function group meeting the network requirement information. Therefore, operation S1013a may be implemented in the following manner:

S1013a3. The NSMF establishes, based on the network requirement information, the AMF group meeting the network requirement information.

S1013a4. The NSMF associates information about the newly created AMF group with one piece of network slice information that is in the at least one network slice information and that meets the network requirement information, to determine the association relationship between the information about the AMF group and the network slice information.

In addition, to enable an NF (for example, a network device such as a gNB) to know a relationship between an access management function group and one or more AMFs included in the access management function group, as shown in FIG. 6, after operation S103, this application further includes the following operations.

S104. The NSMF determines at least one of an association relationship between the information about the AMF group and the information about the first AMF and an association relationship between the information about the AMF group and the network slice selection assistance information S-NSSAI.

The information about the first AMF is information about at least one of all AMFs included in the AMF group indicated by the information about the AMF group. To be specific, the NSMF may determine an association relationship between the AMF group and each of all the AMFs included in the AMF group, or determine, based on a requirement, a relationship between the AMF group and one or more AMFs that meet a preset requirement (for example, load of the one or more AMFs meets the requirement).

Specifically, the NSMF may associate the identifier of the access management function AMF group with an identifier of the first AMF, and determine an obtained association relationship as the association relationship between the access management function AMF group and the first AMF. An identifier of an AMF is used to identify the AMF. Alternatively, the NSMF associates the identifier of the access management function AMF group with the S-NSSAI, and determines an obtained association relationship as the association relationship between the access management function group and the network slice selection assistance information S-NSSAI.

The at least one association relationship in this embodiment of the present invention may be an association relationship between the AMF group and the first AMF; may be an association relationship between the AMF group and the network slice selection assistance information S-NSSAI; or may be an association relationship between the AMF group and the network slice selection assistance information S-NSSAI and an association relationship between the AMF group and the first AMF.

S105. The NSMF sends a second message to the NSSMF, where the second message includes at least one of the association relationship between the information about the AMF group and the information about the first AMF, and the association relationship between the information about the AMF group and the network slice selection assistance information S-NSSAI, and the NSSMF is further configured to configure, for a second network unit (for example, a network device), at least one of the association relationship between the AMF group and the information about the first AMF and the association relationship between the information about the AMF group and the S-NSSAI.

S106. The NSSMF sends at least one of the association relationship between the information about the AMF group and the information about the first AMF or the association relationship between the information about the AMF group and the S-NSSAI to a second network unit (a network function (NF) unit).

In a possible implementation, the NSSMF may send the at least one of the association relationship between the information about the AMF group and the information about the first AMF and the association relationship between the information about the AMF group and the S-NSSAI to the second network unit using a configuration message.

In an embodiment of this application, a process in which the NSSMF configures, for the second network unit, the at least one of the association relationship between the information about the AMF group and the information about the first AMF and the association relationship between the information about the AMF group and the S-NSSAI can be implemented using operation S106.

It may be understood that the NSSMF may configure only the association relationship between the information about the AMF group and the information about the first AMF for the second network unit, or may configure only the association relationship between the information about the AMF group and the network slice selection assistance information S-NSSAI for the second network unit, or configure, for the second network unit, both the association relationship between the information about the AMF group and the network slice selection assistance information S-NSSAI and the association relationship between the information about the AMF group and the information about the first AMF.

It may be understood that, in the method shown in FIG. 4, when the first management unit is the NSMF and the first network unit is at least one of the NSSF, the NRF, or the default AMF (in other words, when the NSSMF is replaced with at least one of the NSSF, the NRF, or the default AMF), operation S103 may be omitted.

In the method shown in FIG. 4, when the first management unit is the NSMF and the second network unit is the NF (in other words, when the NSSMF is replaced with the NF), operation S106 may be omitted.

It should be noted that operation S101 and operation S104 may be independent operations performed in parallel. To be specific, the NSMF may perform only operations S101 to S103, or may perform only S104 to S106. In other words, the NSMF determines only the association relationship between the information about the AMF group and the network slice information, or determines only the at least one of the association relationship between the information about the AMF group and the information about the first AMF and the association relationship between the information about the AMF group and the network slice selection assistance information S-NSSAI. In this case, the NSSMF may perform only a process of configuring the association relationship between the information about the AMF group and the network slice information for the first network unit (for example, a network element), or perform only a process of configuring, for the second network unit (for example, a base station), the at least one of the association relationship between the information about the AMF group and the information about the AMF and the association relationship between the information about the AMF group and the network slice selection assistance information S-NSSAI.

Certainly, alternatively, operations S101 to S103 may be first performed and then operations S104 to S106 are performed. To be specific, the NSMF not only determines the association relationship between the information about the AMF group and the network slice information, but also determines the at least one of the association relationship between the information about the AMF group and the information about the AMF and the association relationship between the information about the AMF group and the network slice selection assistance information S-NSSAI. In this case, the NSSMF may perform any one of a process of configuring the association relationship between the information about the AMF group and the network slice information for the first network unit (for example, a network element), and a process of configuring, for the second network unit (for example, a base station), the at least one of the association relationship between the information about the AMF group and the information about the first AMF and the association relationship between the access management function group and the network slice selection assistance information S-NSSAI.

Certainly, alternatively, operations S104 to S106 may be first performed, and then operations S101 to S103 are performed. To be specific, the NSMF first determines the at least one of the association relationship between the information about the AMF group and the information about the first AMF and the association relationship between the information about the AMF group and the network slice selection assistance information S-NSSAI, and then determines the association relationship between the information about the AMF group and the network slice information. In an embodiment of this application, an example in which operations S104 to S106 are further included after operation S103 is merely used for description. In an actual process, operations S101 to S103 and S104 to S106 may be two independent implementation processes.

Specifically, in a possible implementation, operation S104 may be implemented in the following manner:

Operation S1041. The NSMF associates the information about the AMF group with at least one of the information about the first AMF and the network slice selection assistance information S-NSSAI, to determine the at least one of the association relationship between the information about the AMF group and the information about the first AMF and the association relationship between the information about the AMF group and the S-NSSAI.

Specifically, the NSMF associates the information about the AMF group with the information about the first AMF, to determine the association relationship between the information about the AMF group and the information about the first AMF, and associates the information about the AMF group with the network slice selection assistance information S-NSSAI, to determine the association relationship between the information about the AMF group and the S-NSSAI.

Specifically, the NSMF associates the identifier of the AMF group with the identifier of the first AMF, and determines an obtained association relationship as the association relationship between the information about the AMF group and the information about the first AMF. The NSMF may associate the information about the AMF group with the S-NSSAI, and determine an obtained association relationship as the association relationship between the information about the AMF group and the S-NSSAI.

In addition, to reduce a plurality of interactions between the NSMF and the NSSMF, in an embodiment of this application, the first message in operation S102 may further include at least one of the association relationship between the AMF group and the first AMF and the association relationship between the AMF group and the S-NSSAI. In other words, the NSMF may directly send, to the NSSMF using the first message, the association relationship between the AMF group and the network slice information and the at least one of the association relationship between the AMF group and the first AMF and the association relationship between the AMF group and the S-NSSAI. In this case, operation S105 may be omitted.

In an embodiment of this application, the NSMF may alternatively obtain the association relationship between the information about the AMF group and the network slice information from another management unit. For example, the NSMF may obtain the association relationship between the information about the AMF group and the network slice information from a third message sent by the another management unit. In this case, the third message may further include the at least one of the association relationship between the information about the AMF group and the information about the first AMF and the association relationship between the information about the AMF group and the S-NSSAI. Therefore, when the third message includes the at least one of the association relationship between the information about the AMF group and the information about the first AMF and the association relationship between the information about the AMF group and the network slice selection assistance information S-NSSAI, the first message sent by the NSMF to the NSSMF may further include the at least one of the association relationship between the information about the AMF group and the information about the first AMF and the association relationship between the information about the AMF group and the S-NSSAI.

This application provides an information configuration method. The first management unit (for example, the first management unit may be the NSSMF) determines the at least one of the association relationship between the information about the access management function AMF group and the information about the first AMF and the association relationship between the information about the AMF group and the S-NSSAI. Then, the first management unit sends the at least one association relationship to the second network unit (for example, the gNB). In an actual process, the second network unit does not have the at least one association relationship. Therefore, the at least one association relationship is configured for the second network unit, so that the second network unit can determine, based on the configured at least one association relationship, an AMF meeting the requirement of the UE, to forward the service request information of the UE.

It should be noted that, in the architecture shown in FIG. 2, the NSMF provided in this embodiment of the present invention may further directly send, to the second network unit (for example, the gNB), the at least one of the association relationship between the information about the access management function AMF group and the information about the first AMF and the association relationship between the information about the AMF group and the network slice selection assistance information S-NSSAI.

Figure 7:
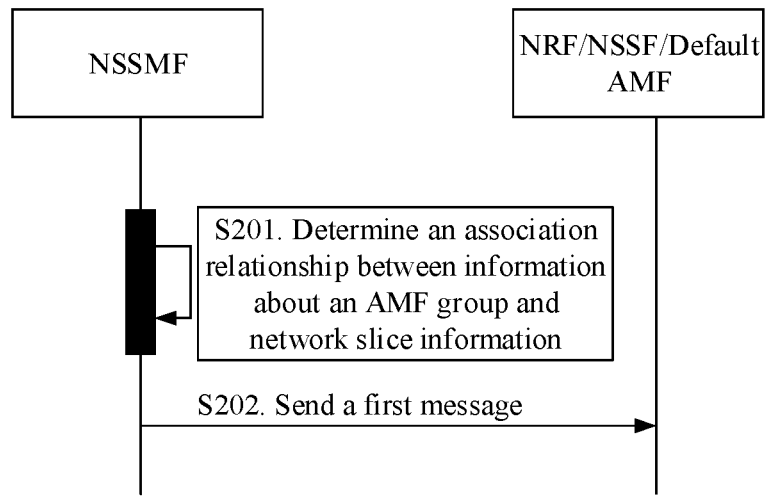
FIG. 7 is a schematic flowchart 4 of an information configuration method according to an embodiment of the present invention.

FIG. 7 is a schematic communication diagram of an information configuration method according to this application. The method shown in FIG. 7 may be applied to the network architecture shown in FIG. 3. As shown in FIG. 7, an information configuration method provided in an embodiment of this application includes the following operations.

Operation S201. An NSSMF determines an association relationship between information about a first AMF group and first network slice information, where the association relationship is used to instruct a first network unit to determine the first network slice information based on the information about the first AMF group or determine the information about the first AMF group based on the first network slice information. The first AMF group is one of at least one AMF group, and the first network slice information is at least one of a plurality of pieces of network slice information, or the first network slice information is one of at least one piece of network slice information.

In a possible implementation, the NSSMF may associate an identifier of the first AMF group with one piece of network slice information (for example, the first network slice information) in the at least one piece of network slice information, and use an obtained association relationship as an association relationship between the first access management function AMF group and the first network slice information.

Operation S202. The NSSMF sends a first message to the first network unit (for example, an NRF/NSSF/default AMF), where the first message includes the association relationship between the information about the first AMF group and the first network slice information.

The association relationship between the information about the first AMF group and the first network slice information is used to enable the NRF/NSSF/default AMF to select, based on a service request (for example, a registration request) of user equipment, an access management function AMF group meeting a requirement. When receiving the service request sent by the UE, the NRF/NSSF/default AMF usually determines network slice information meeting the service request, for example, slice instance information. Therefore, the association relationship between the first network slice information and the first access management function AMF group is configured, so that the NRF/NSSF/default AMF can determine, based on the network slice information determined based on the service request message of the UE, the first access management function AMF group that has the association relationship with the first network slice information.

This application provides an information configuration method. The NSSMF determines an association relationship between information about one AMF group (for example, the information about the first AMF group) in the at least one AMF group and one piece of network slice information (for example, the first network slice information) in the at least one piece of network slice information, that is, determines the association relationship between the information about the first AMF group and the first network slice information, and sends the association relationship between the information about the first AMF group and the first network slice information to the NRF/NSSF/default AMF using the first message. In this way, when a network includes a plurality of AMF groups, the association relationship determined by the NSSMF can enable the NRF or NSSF or default AMF for which the association relationship is finally configured to select a valid AMF group for the corresponding service request initiated by the UE, so that the selected AMF group meets the service request of the UE.

In one embodiment, in another possible implementation, operation S201 may be implemented in the following manner:

Operation S201a. The NSSMF receives the association relationship that is sent by an NSMF and that is between the first AMF group and the first network slice information, to determine the association relationship between the first AMF group and the first network slice information.

For example, when the NSMF interacts with the NSSMF, the NSMF may add the association relationship between the first AMF group and the first network slice information to a third message, and send the third message to the NSSMF. Therefore, the NSSMF obtains the association relationship between the first AMF group and the first network slice information from the third message, determines the association relationship as the association relationship that is in the first message and that is between the first access management function AMF group and the first network slice information.

Figure 8:
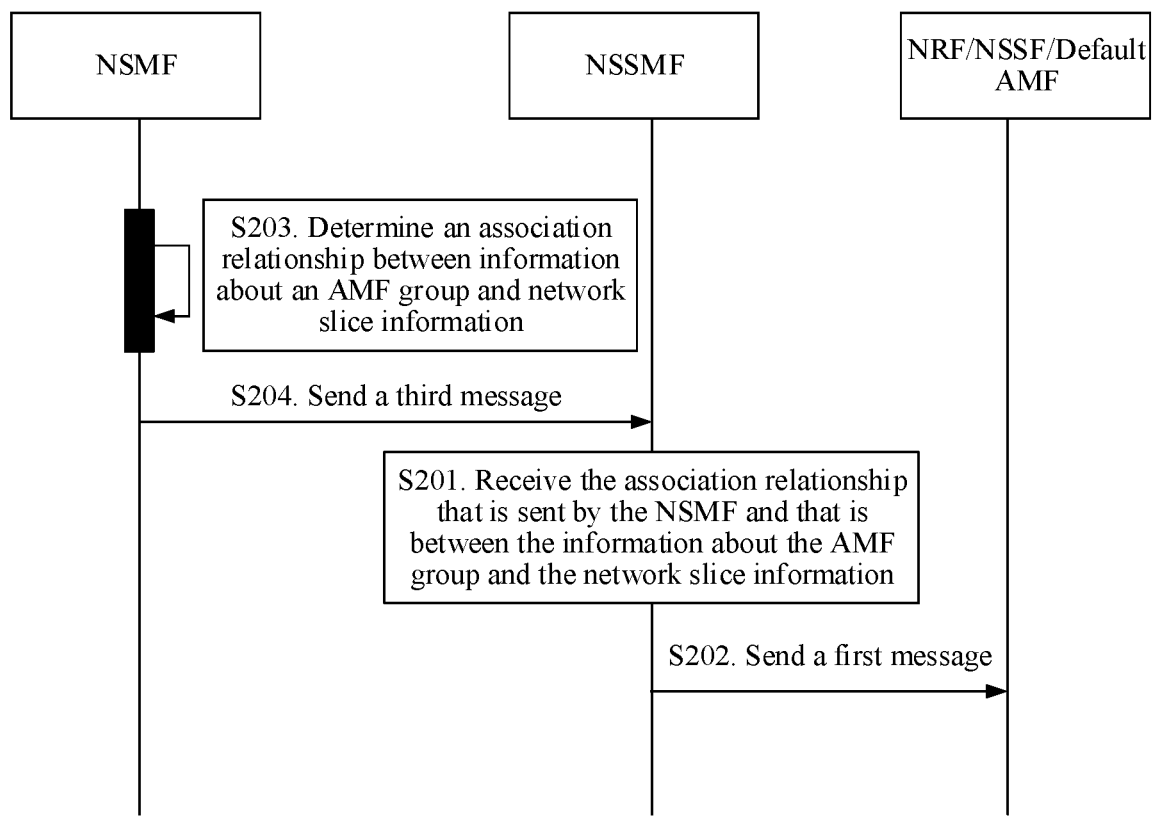
FIG. 8 is a schematic flowchart 5 of an information configuration method according to an embodiment of the present invention.

Therefore, when operation S201 is implemented using operation S201a, as shown in FIG. 8, before operation S201 in an embodiment of this application, the method further includes the following operations.

Operation S203. The NSMF determines the association relationship between one AMF group (for example, the first AMF group) in the at least one AMF group and one piece of network slice information (for example, the first network slice information) in the at least one piece of network slice information.

Specifically, the NSMF may use the association relationship between the identifier of the first AMF group and the first network slice information as the association relationship between the first access management function AMF group and the first network slice information.

Operation S204. The NSMF sends the third message to the NSSMF, where the third message includes the association relationship between the first AMF group and the first network slice information.

Figure 9:
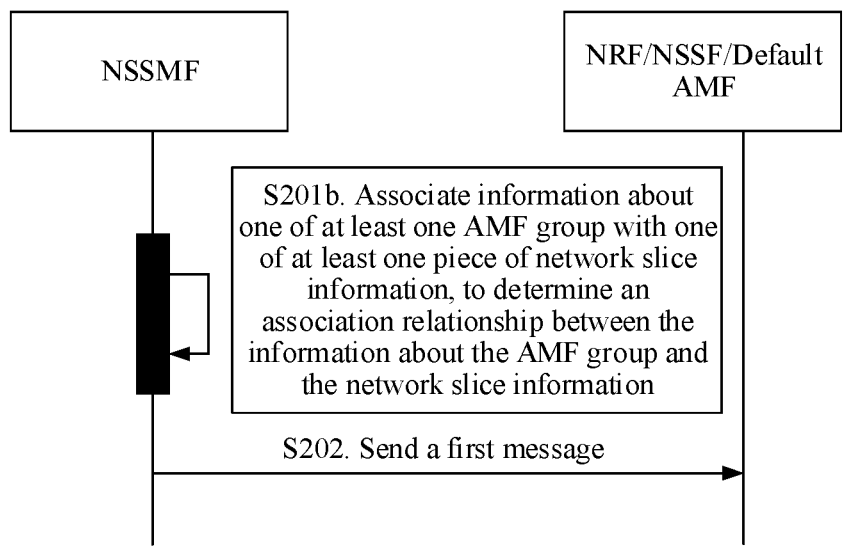
FIG. 9 is a schematic flowchart 6 of an information configuration method according to an embodiment of the present invention.

In one embodiment, in a possible implementation, as shown in FIG. 9, operation S201 may be implemented in the following manner:

Operation S201b. The NSSMF associates the first AMF group with one piece of network slice information (for example, the first network slice information) in the at least one piece of network slice information, to determine the association relationship between the first access management function AMF group and the first network slice information.

Specifically, operation S201b may be implemented in the following manner: The NSSMF determines, based on the first AMF group, one piece of network slice information in the at least one piece of network slice information, and associates the determined network slice information with the first AMF group, to determine the association relationship between the first access management function group and the network slice information in the at least one piece of network slice information. Alternatively, the NSSMF determines the information about the first AMF group based on one piece of network slice information in the at least one piece of network slice information, and associates the determined information about the first AMF group with the network slice information in the at least one piece of network slice information, to determine the association relationship between the first AMF group and the first network slice information.

Figure 10:
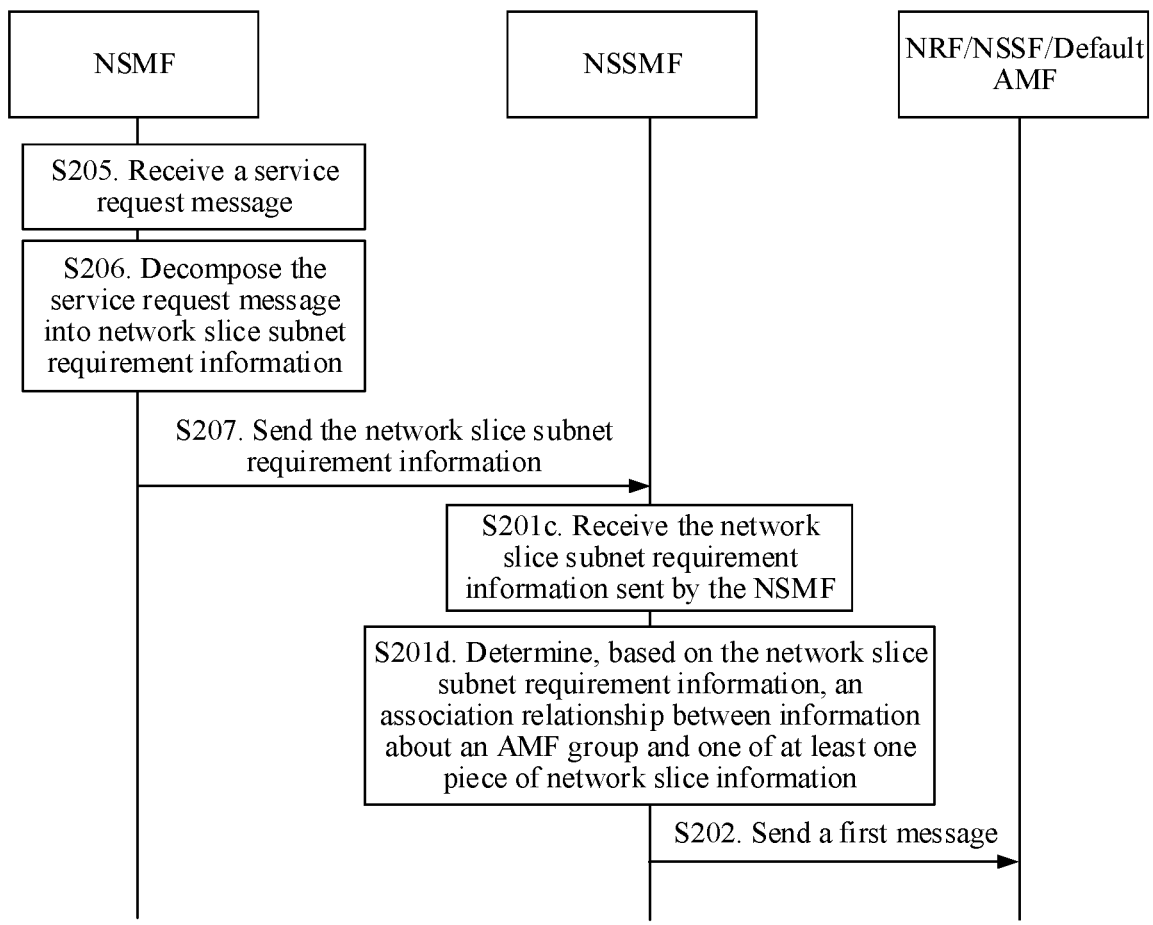
FIG. 10 is a schematic flowchart 7 of an information configuration method according to an embodiment of the present invention.

In another possible implementation, as shown in FIG. 10, before operation S201, the method further includes the following operations.

Operation S205. The NSMF receives a service request message, where the service request message carries network requirement information.

Operation S206. The NSMF decomposes the service request message into network slice subnet requirement information.

Operation S207. The NSMF sends the network slice subnet requirement information to the NSSMF.

Therefore, operation S201 may be implemented in the following manner:

Operation S201c. The NSSMF receives the subnet requirement information sent by the NSMF, where the subnet requirement information is used to instruct the NSSMF to determine the association relationship between one AMF group (for example, the first AMF group) in the at least one access management function AMF group and one piece of network slice information (for example, the first network slice information) in the at least one piece of network slice information.

Operation S201d. The NSSMF determines, based on the network slice subnet requirement information, the association relationship between one AMF group (for example, the first AMF group) in the at least one access management function AMF group and one piece of network slice information (for example, the first network slice information) in the at least one piece of network slice information.

Specifically, operation S201d may be implemented in the following manner: The NSSMF obtains, based on the subnet requirement information, the first access management function group and the first network slice information that meet the subnet requirement information, and associates the first access management function group and the first network slice information that meet the network slice subnet requirement information, to determine the association relationship between the first access management function group and the first network slice information.

In an actual process, the NSSMF may have only any one or more of the first network slice information meeting the network slice subnet requirement information and the first AMF group meeting the network slice subnet requirement information. Therefore, operation S201d may be specifically implemented in the following manner:

In one aspect, when the NSSMF determines that the at least one piece of network slice information includes one piece of network slice information meeting the network slice subnet requirement information, the NSSMF associates the piece of network slice information that is in the at least one piece of network slice information and that meets the network slice subnet requirement information with the information about the first AMF group, to determine the association relationship between the information about the first AMF group and the piece of network slice information (for example, the first network slice information) in the at least one piece of network slice information.

In another aspect, when the NSSMF determines that the at least one piece of network slice information does not include the first network slice information meeting the subnet requirement information, the NSSMF creates the first network slice information meeting the subnet requirement information (in this case, there may be one or more pieces of newly created network slice information), and associates the newly created network slice information meeting the subnet requirement information with the first access management function group (one of the at least one access management function group existing in the NSSMF), to determine the association relationship between the first access management function group and the first network slice information.

In addition, operation S201d may alternatively be implemented in the following manner:

In one aspect, when the NSSMF determines that the at least one access management function group included in the NSSMF includes one access management function group (that is, the first access management function group) meeting the subnet requirement information, the NSSMF associates the first access management function group meeting the subnet requirement information with one of the at least one piece of network slice information, to determine the association relationship between the first access management function group and the piece of network slice information in the at least one piece of network slice information.

In another aspect, when the NSSMF determines that the at least one access management function group included in the NSSMF does not have the first access management function group meeting the subnet requirement information or the NSSMF does not have the first access management function group meeting the subnet requirement information, the NSSMF creates the first access management function group meeting the subnet requirement information, and associates the newly created first access management function group meeting the subnet requirement information with one of the at least one piece of network slice information, to determine the association relationship between the first access management function group and the piece of network slice information in the at least one piece of network slice information.

Alternatively, the NSSMF determines that the NSSMF does not have the first network slice information meeting the subnet requirement information and the first access management function group meeting the subnet requirement information, the NSSMF creates the first network slice information and the first access management function group that meet the subnet requirement information, and associates the created first network slice information and first access management function group that meet the subnet requirement information, to determine the association relationship between the first access management function group and the first network slice information. This case is applicable to a scenario in which the NSSMF does not have the first network slice information and the first access management function group that meet the subnet requirement information. Alternatively, when the NSSMF has the first network slice information and the first access management function group that meet the subnet requirement information, the NSSMF may associate, based on the subnet requirement information, one piece of network slice information in the at least one piece of network slice information with one access management function group in the at least one access management function group, to determine the association relationship between the first access management function group and the first network slice information.

In one embodiment, the network slice information includes any one or more of the following: a network slice instance identifier, a network slice instance management object identifier, a network slice subnet instance identifier, a network slice subnet management object identifier, network slice selection assistance information S-NSSAI, a network slice type, a service type, a tenant identifier, and/or a public land mobile communications network PLMN.

Figure 11:
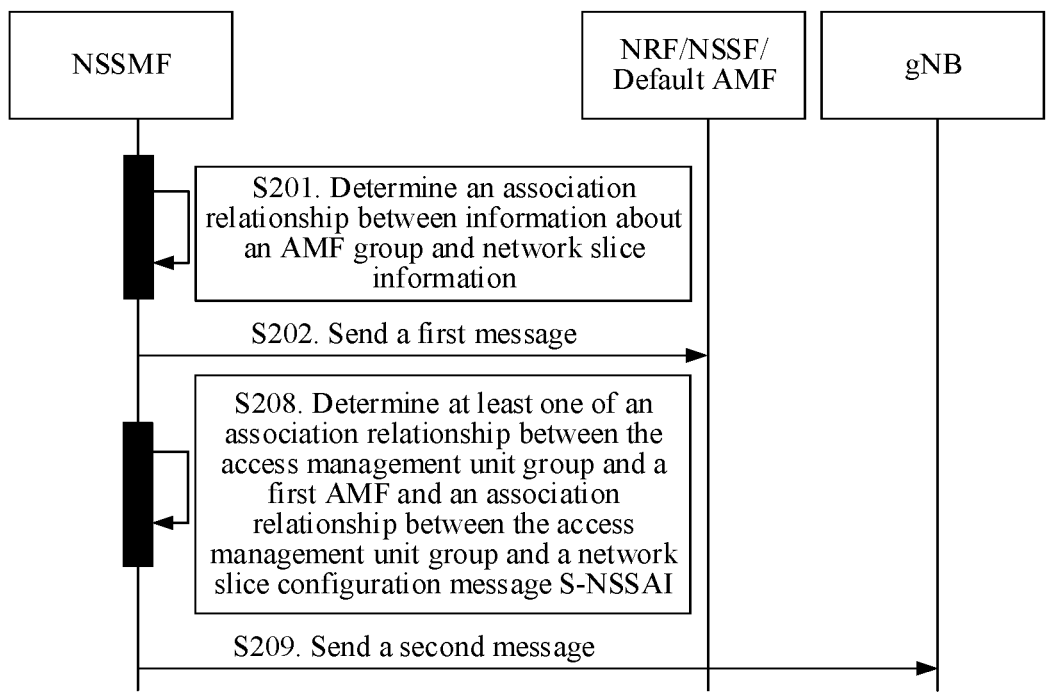
FIG. 11 is a schematic flowchart 8 of an information configuration method according to an embodiment of the present invention.

In one embodiment, with reference to FIG. 7, as shown in FIG. 11, the method provided in an embodiment of this application further includes the following operations.

Operation S208. The NSSMF determines at least one of an association relationship between information about an access management function AMF group and information about a first AMF and an association relationship between the information about the AMF group and network slice selection assistance information S-NSSAI.

In a possible implementation, the NSSMF may use an association relationship between an identifier of the AMF group and an identifier of the first AMF as an association relationship between the AMF group and the information about the first AMF, and use an association relationship between the identifier of the AMF group and the S-NSSAI as an association relationship between the AMF group and the S-NSSAI. As described above, the NSSMF may determine the association relationship between the information about the access management function AMF group and the information about the first AMF, or may determine the association relationship between the information about the AMF group and the network slice selection assistance information S-NSSAI, or may determine the association relationship between the information about the AMF group and the information about the first AMF and the association relationship between the information about the AMF group and the network slice selection assistance information S-NSSAI.

Operation S209. The NSSMF sends a second message to an NF (for example, a gNB), where the second message includes the at least one of the association relationship between the information about the AMF group and the information about the first AMF and the association relationship between the information about the AMF group and the network slice selection assistance information S-NSSAI.

This application provides an information configuration method. The NSSMF determines the at least one of the association relationship between the information about the access management function AMF group and the information about the first AMF and the association relationship between the information about the AMF group and the network slice selection assistance information S-NSSAI, and the NSSMF sends the at least one association relationship to the NF. In an actual network structure, the NF usually does not have the at least one of the association relationship between the information about the AMF group and the information about the first AMF and the association relationship between the information about the AMF group and the network slice selection assistance information S-NSSAI. Therefore, the NSSMF configures the at least one association relationship for the NF, so that the NF can determine, based on the configured at least one association relationship, an AMF meeting the requirement of the UE, to forward the service request information of the UE.

It may be understood that, in an embodiment of this application, the NSSMF may implement, by sending the second message to the NF, a process in which the NSSMF configures, for a network element, the at least one of the association relationship between the information about the access management function AMF group and the information about the first AMF and the association relationship between the information about the AMF group and the network slice selection assistance information S-NSSAI.

In one embodiment, operation S208 in this application may be implemented in the following manner:

Operation S208a. The NSSMF associates the information about the AMF group with the information about the first AMF and the network slice selection assistance information S-NSSAI, to determine the at least one of the association relationship between the information about the AMF group and the information about the first AMF and the association relationship between the AMF group and the network slice selection assistance information S-NSSAI.

In one embodiment, in another possible implementation, operation S208 provided in this application may be implemented in the following manner:

Operation S208b. The NSSMF receives the at least one association relationship that is sent by the NSMF and that is in the association relationship between the information about the AMF group and the information about the first AMF and the association relationship between the information about the AMF group and the network slice selection assistance information S-NSSAI, to determine the at least one of the association relationship between the information about the access management function group and the information about the first AMF and the association relationship between the information about the AMF group and the network slice selection assistance information S-NSSAI.

It may be understood that, if receiving the association relationship that is sent by the NSMF and that is between the information about the AMF group and the information about the first AMF, the NSSMF determines the association relationship between the information about the AMF group and the information about the first AMF; and if receiving the association relationship that is sent by the NSMF and that is between the information about the AMF group and the network slice selection assistance information S-NSSAI, the NSSMF determines the association relationship between the information about the AMF group and the network slice selection assistance information S-NSSAI.

Figure 12:
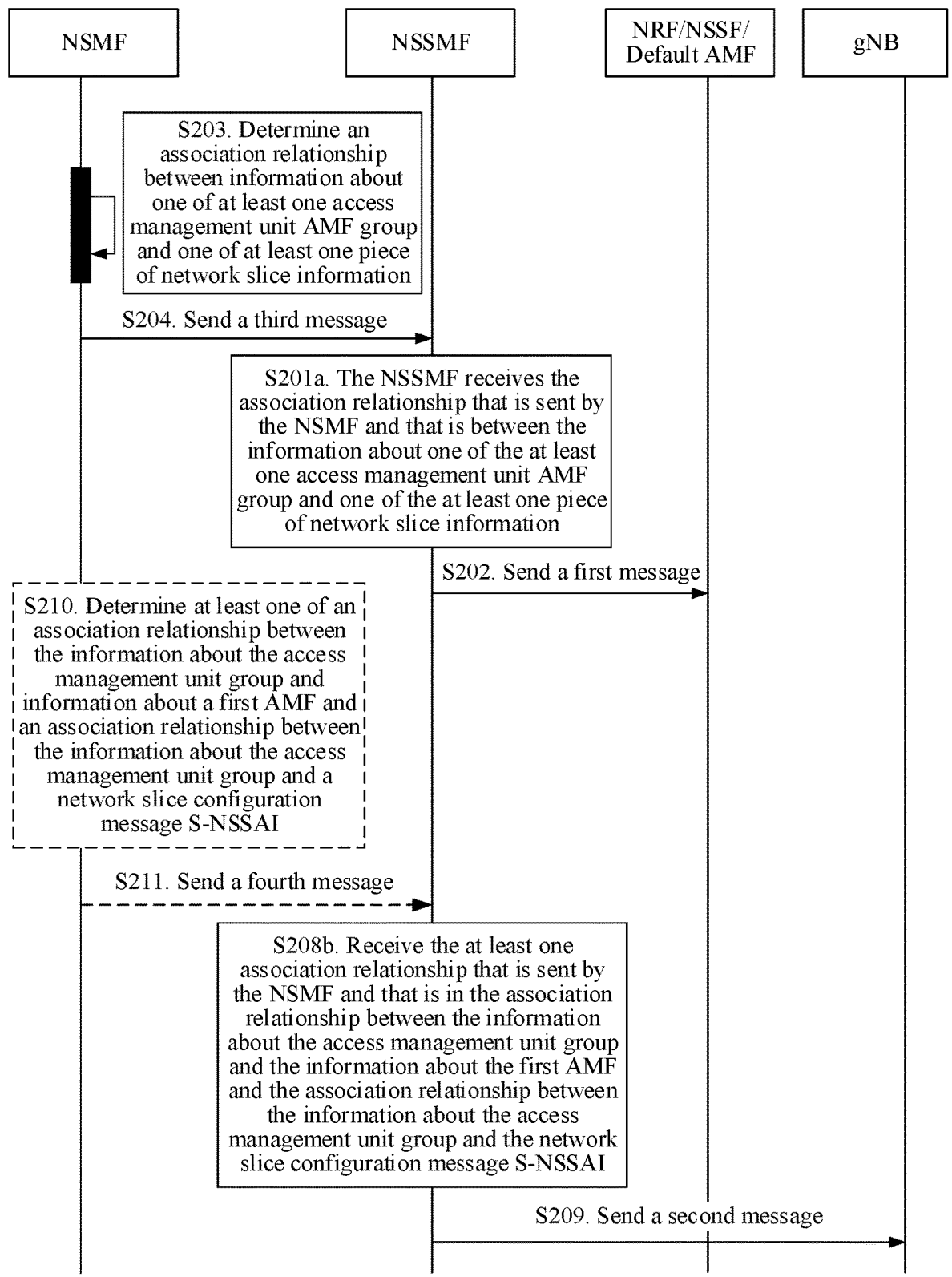
FIG. 12 is a schematic flowchart 9 of an information configuration method according to an embodiment of the present invention.

Therefore, when operation S208 is implemented using operation S208b, in one embodiment, with reference to FIG. 8, as shown in FIG. 12, before operation S208b, operations in an embodiment of this application further include the following operations.

Operation S210. If determining the association relationship between the information about the AMF group and the information about the first AMF, the NSMF determines at least one of the association relationship between the AMF group and the information about the first AMF.

Specifically, the NSMF determines the association relationship between the identifier of the first AMF and the identifier of the access management function group, and determines the association relationship between the identifier of the AMF group and the network slice selection assistance information S-NSSAI.

Operation S211. The NSMF sends a fourth message to the NSSMF, where the fourth message includes the association relationship between the information about the access management function group and the information about the first AMF, and the NSSMF determines at least one of the association relationship between the information about the access management function group and the information about the first AMF.

In one embodiment, in a possible implementation, operation S208 may alternatively be implemented in the following manner:

Operation S208c. The NSSMF receives a network requirement message sent by the NSMF, where the network requirement message carries the network slice subnet requirement information. It may be understood that the NSMF decomposes the request message received by the NSMF into the subnet requirement information and sends the subnet requirement information to the NSSMF.

Operation S208d. The NSSMF determines, based on the network slice subnet requirement information, the association relationship between the information about the access management function group and the information about the first AMF, and the NSSMF determines at least one of the association relationship between the information about the access management function group and the information about the first AMF.

Figure 13A:
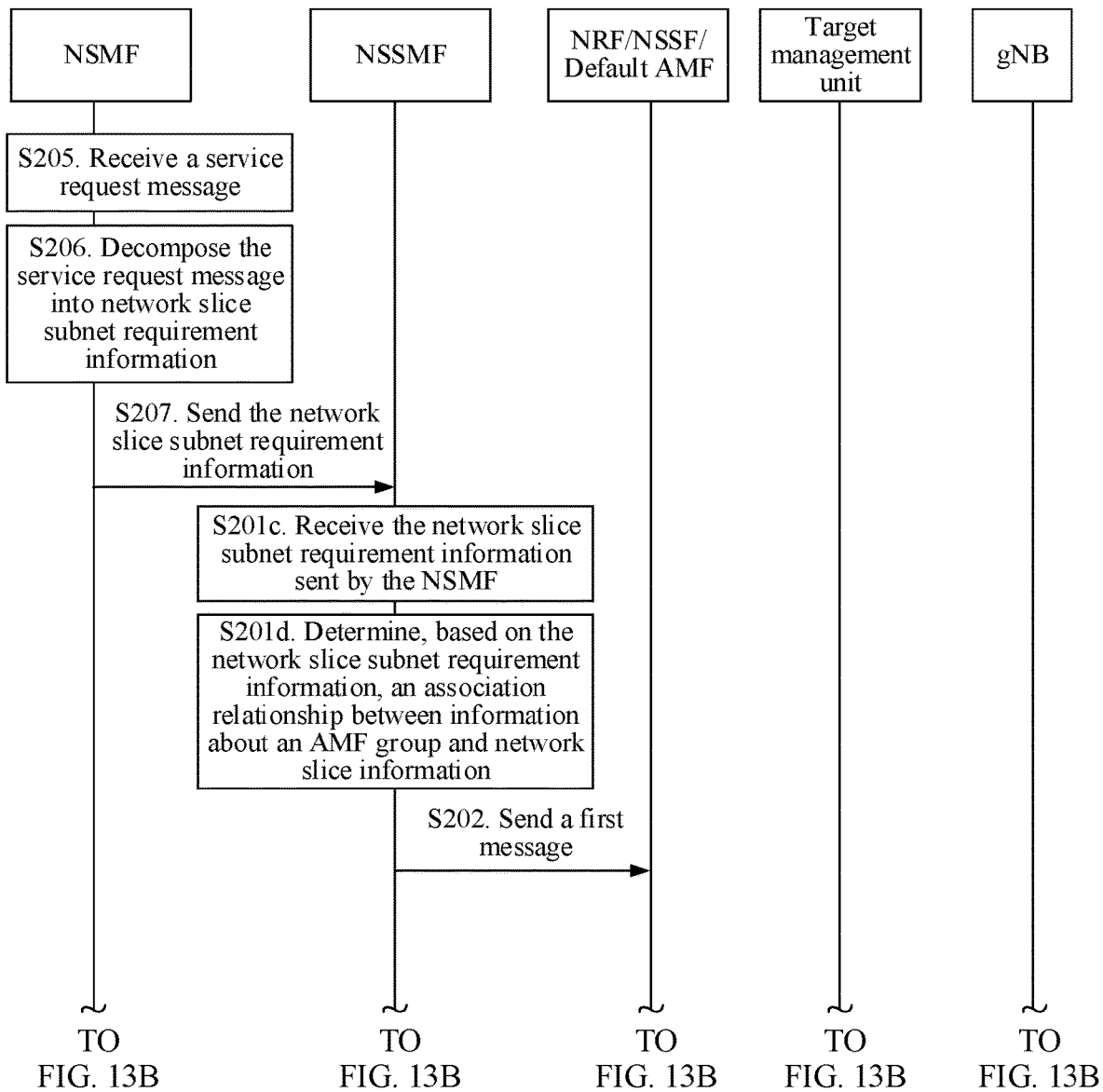
FIG. 13A and FIG. 13B are a schematic flowchart 10 of an information configuration method according to an embodiment of the present invention.
Figure 13B:
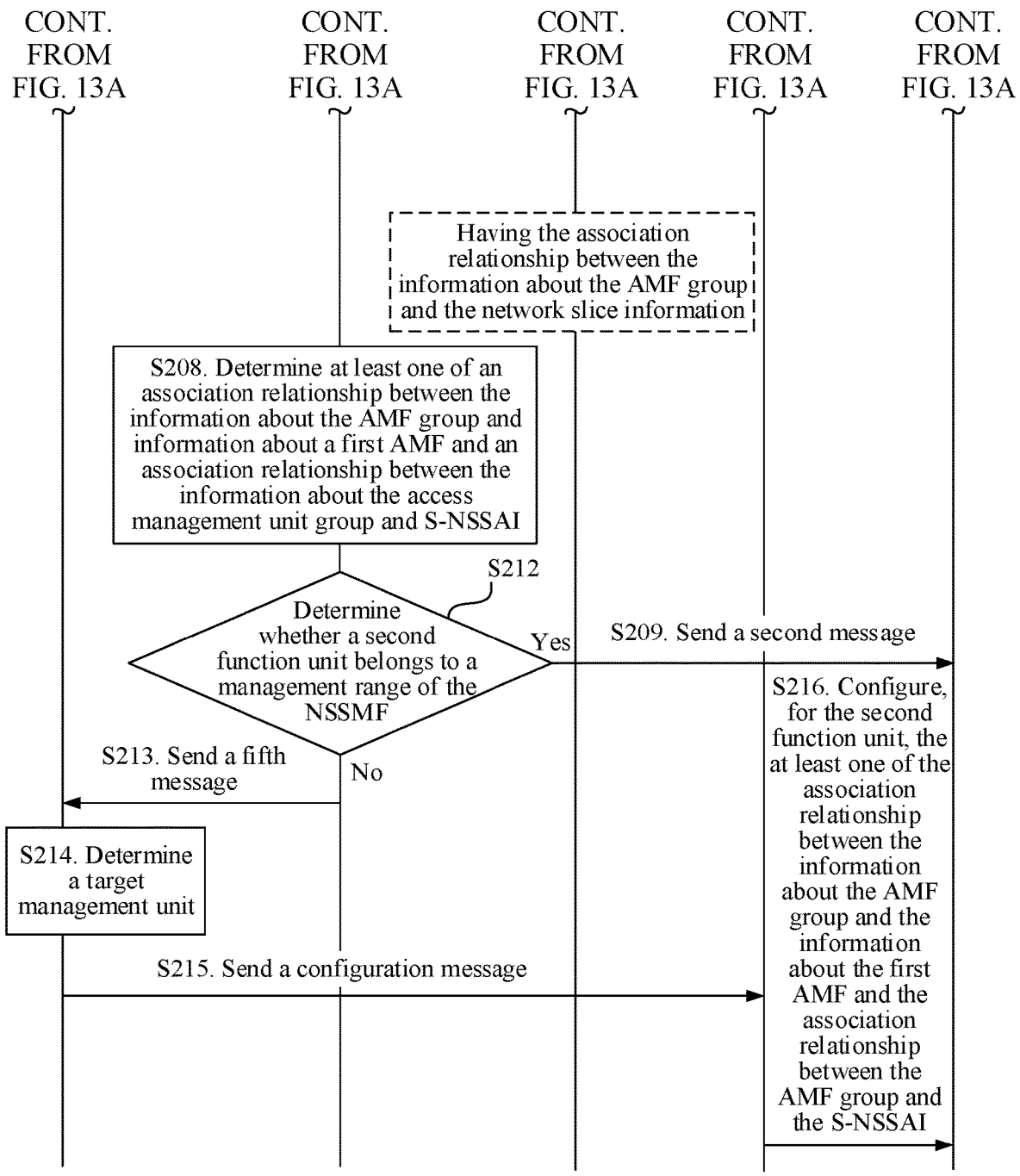

With reference to FIG. 11 or FIG. 12, as shown in FIG. 13B, after operation S208, this application further includes the following operations.

Operation S212. The NSSMF determines whether a second network unit belongs to a management range of the NSSMF; and if yes, performs operation S209; or if no, performs operation S213.

Operation S213. When the NSSMF determines that the second network unit does not belong to the management range of the NSSMF, the NSSMF sends a fifth message to the NSMF, where the fifth message carries the association relationship between the access management function group and the first AMF, the NSMF determines at least one of the association relationship between the access management function group and the first AMF; and the fifth message is used to instruct the NSMF to determine to configure the association relationship between the access management function group and the first AMF for the second network unit, the NSMF determines a target management unit that configures the at least one of the association relationship between the access management function group and the first AMF.

In one embodiment, the fifth message further carries an identifier of the second network unit, and the identifier is used to uniquely identify the second network unit.

Operation S214. The NSMF determines the target management unit based on the fifth message.

Operation S215. The NSMF sends a configuration message to the target management unit, where the configuration message includes the association relationship between the access management function group and the first AMF, the target management unit determines at least one of the association relationship between the access management function group and the first AMF, so that the target management unit determines to configure, for the second network unit, the association relationship between the access management function group and the first AMF, and the second network unit determines the at least one of the association relationship between the access management function group and the first AMF.

Operation S216. If the target management unit configures the association relationship between the access management function group and the first AMF for the second network unit, and the second network unit determines at least one of the association relationship between the access management function group and the first AMF.

In one embodiment, the third message further includes the association relationship between the access management function group and the first AMF, and the NSMF determines at least one of the association relationship between the access management function group and the first AMF. In this case, operation S208 in the foregoing embodiment may be omitted.

It may be understood that, operations S201 and S208 may be used as two independent implementations. To be specific, the NSSMF determines only the association relationship between one AMF group (for example, the first AMF group) in the at least one AMF group and one piece of network slice information (for example, the first network slice information) in the at least one piece of network slice information, and configures, for the first network unit (the NRF or the default AMF), only the association relationship between the first AMF group and the first network slice information. Alternatively, the NSSMF may determine only at least one of an association relationship between the information about the AMF group and information about each of one or more AMFs included in the AMF group indicated by the information about the AMF group and the association relationship between the AMF group and the network slice selection assistance information S-NSSAI, and configures, for the gNB, only the at least one of the association relationship between the information about the AMF group and the information about the first AMF and the association relationship between the information about the AMF group and the network slice selection assistance information S-NSSAI. Alternatively, in an implementation, the NSSMF determines both the association relationship between the AMF group and at least one of a plurality of pieces of network slice information and the at least one of the association relationship between the information about the AMF group and the information about the first AMF and the association relationship between the information about the AMF group and the network slice selection assistance information S-NSSAI.

In addition, in the architecture shown in FIG. 3, to be specific, in an architecture in which the first management unit is an NSSMF, the second management unit is an NSMF, and the first network unit is a network element, this application further provides an information configuration method, including the following operations.

Operation S301. The NSSMF receives a first message sent by the NSMF, where the first message includes an association relationship between information about one of at least one access management function AMF group and one of at least one piece of network slice information.

Operation S302. The NSSMF sends, to the first network unit, the association relationship between the information about the AMF group in the at least one access management function AMF group and the piece of network slice information in the at least one piece of network slice information.

This application provides an information configuration method. The NSSMF receives the association relationship that is sent by the NSMF using the first message and that is between the AMF group in the at least one AMF group and one of at least one piece of AMF selection information, to determine an association relationship between a first AMF group and first network slice information. In this way, convenience of determining the association relationship by the NSSMF can be improved, processing load of a processor of the NSSMF is alleviated. Then, the association relationship between the first AMF group and the first network slice information is sent to the first network unit (for example, an NRF/NSSF/default AMF). In this way, when a network includes a plurality of AMF groups, the NSSMF determines the association relationship based on the first message sent by the NSMF, so that the NRF or NSSF or default AMF for which the association relationship is finally configured can select a valid AMF group for a corresponding service request initiated by UE, so that the selected AMF group meets the service request of the UE.

In addition, in the architecture shown in FIG. 3, to be specific, in an architecture in which the first management unit is an NSSMF, the second management unit is an NSMF, and the first network unit is a network element, this application further provides an information configuration method, including the following operations.

Operation S401. The NSSMF receives a first message sent by the NSMF, where the first message includes at least one of an association relationship between information about an AMF group and information about a first AMF and an association relationship between the information about the AMF group and network slice selection assistance information S-NSSAI.

Operation S402. The NSSMF sends, to a second network unit, the at least one of the association relationship between the information about the access management function AMF group and the information about the first AMF and the association relationship between the information about the AMF group and the network slice selection assistance information S-NSSAI.

This application according to an embodiment provides an information configuration method. The NSSMF receives the at least one association relationship that is sent by the NSMF using the first message and that is in the association relationship between the information about the AMF group and the information about the first AMF and the association relationship between the information about the AMF group and the network slice selection assistance information S-NSSAI. In this way, the NSSMF can associate, based on the received at least one association, information about an AMF group existing in the NSSMF with the first AMF or the S-NSSAI, to alleviate processing load of the NSSMF. Then, the NSSMF sends, to the second network unit (for example, a gNB), at least one of an association relationship between the AMF group and the first AMF and an association relationship between the AMF group and the network slice selection assistance information S-NSSAI. In an actual network structure, the second network unit usually does not have the at least one association relationship. Therefore, in the prior art, when UE initiates a service request, the gNB usually randomly selects an AMF to forward the service request of the UE. Consequently, the selected AMF may not meet a requirement of the UE. However, in an embodiment of this application, the at least one association relationship is configured for the second network unit, so that the second network unit for which the at least one association relationship is finally configured can select a valid AMF for the corresponding service request initiated by the UE, to forward the service request of the UE.

The solutions provided according to embodiments in this application are mainly described above from a perspective of interaction between network elements. It may be understood that to perform the foregoing functions, each network element, for example, the first management unit or the second management unit, includes a corresponding hardware structure and/or software module for performing the functions. A person skilled in the art should easily be aware that, in combination with the examples described in the embodiments disclosed in this specification, units, and algorithms operations may be implemented by hardware or a combination of hardware and computer software in embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In an embodiment of this application, the first management unit, the second management unit, and the like may be divided into function modules based on the foregoing method examples. For example, the function modules may be obtained through division based on the corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

For ease of description, when structures of the first management unit and the second management unit are described, an example in which the first management unit is an NSSMF, and the second management unit is an NSMF is used.

Figure 14:
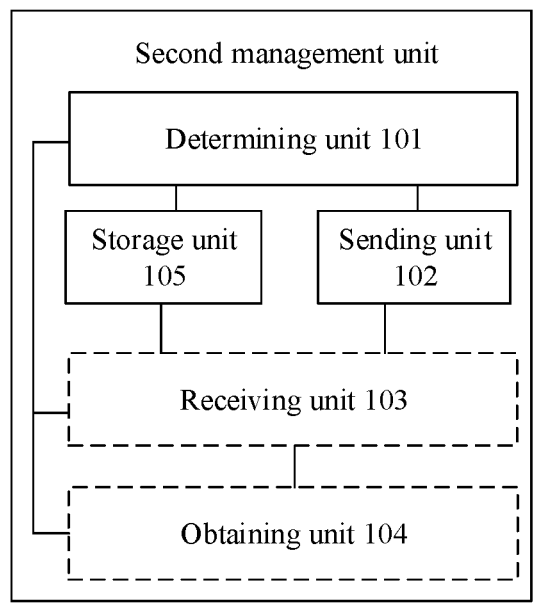
FIG. 14 is a schematic structural diagram of a second management unit according to an embodiment of the present invention.

When an integrated unit is used, FIG. 14 is a possible schematic structural diagram of the second management unit in the foregoing embodiments. The second management unit includes a determining unit 101 and a sending unit 102. The determining unit 101 is configured to support the second management unit in performing operation S101 (which may be specifically operations S1011, S1011a, and S1011b), S1013, S1013b, S1013a1, S1013a2, S1013a4, and/or S104 (which may be specifically S1041) in the foregoing embodiments. The sending unit 102 is configured to support the second management unit in performing operations S102 and S105 in the foregoing embodiments. In addition, the second management unit provided in an embodiment of this application further includes a receiving unit 103, an obtaining unit 104, and a storage unit 105. The receiving unit 103 is configured to support the second management unit in performing operation S1012 in the foregoing embodiment. The obtaining unit 104 is configured to support the second management unit in performing operations S1013a and S1013a3 in the foregoing embodiment. The storage unit 105 is configured to perform an operation of storing the association relationship by the second management unit, and a specific implementation process of storing the association relationship by the first management unit, and/or another process in the technologies described in this specification. All related content of the operations in the foregoing method embodiments may be cited in function descriptions of the corresponding function modules. Details are not described herein again.

Based on hardware implementation, the receiving unit 103 may be a receiver of the second management unit, and the sending unit 102 may be a transmitter of the second management unit. Usually, the receiver and the transceiver may be integrated together to serve as a transceiver. Specifically, the receiving unit 103 and the sending unit 102 may be a communications interface of the second management unit, the determining unit 101 and the obtaining unit 104 may be integrated into a processor of the second management unit, and the storage unit 105 may be integrated into a memory of the second management unit.

Figure 15:
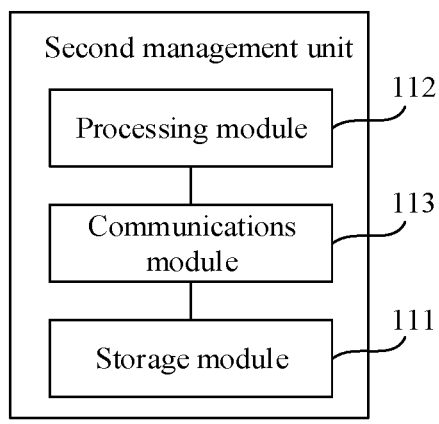
FIG. 15 is a schematic structural diagram of another second management unit according to an embodiment of the present invention.

When an integrated unit is used, FIG. 15 is a possible schematic diagram of a logic structure of the second management unit in the foregoing embodiments. The second management unit includes a processing module 112 and a communications module 113. The processing module 112 is configured to control and manage an action of the second management unit. For example, the processing module 112 is configured to support the second management unit in performing operation S101 (which may be specifically operations S1011, S1011a, and/or S1011b), S1013, S1013b, S1013a1, S1013a2, S1013a4, S104 (which may be specifically operation S1041), S1013a, and/or S1013a3 in the foregoing embodiments. The communications module 113 is configured to support the second management unit in performing operations S102, S105, and S1012 in the foregoing embodiments, performing a operation of storing the association relationship by the second management unit, and a specific implementation process of storing the association relationship by the first management unit, and/or another process of the technologies described in this specification. The communications module 113 is mainly configured to communicate with the first management unit or a first network unit (for example, a gNB and an NSSF), for example, support the second management unit in performing operation S1012. The second management unit may further include a storage module 111, configured to store program code and data of the second management unit.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in embodiments of the present invention. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 16:
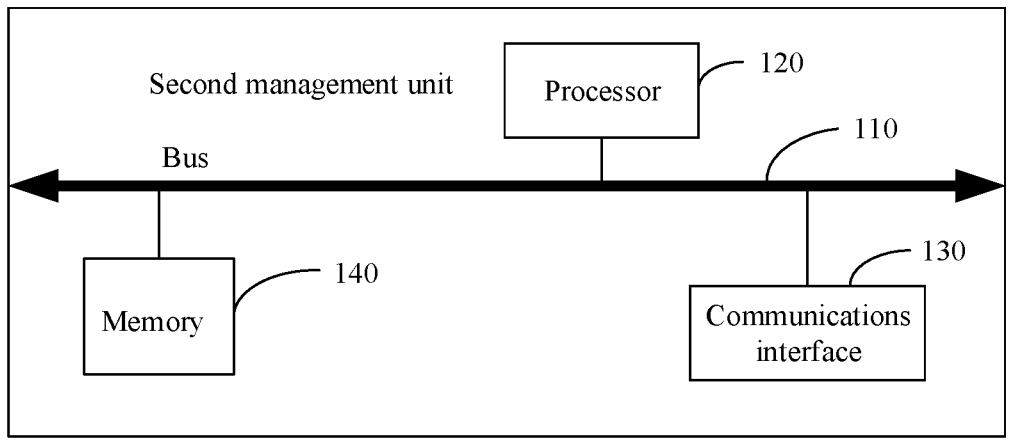
FIG. 16 is a schematic structural diagram of still another second management unit according to an embodiment of the present invention.

When the processing module 112 is a processor 120, the communications module 113 is a communications interface 130 or a transceiver, and the storage module 111 is a memory 140, the second management unit may be a device shown in FIG. 16.

The communications interface 130, the processor 120, and the memory 140 are connected to each other using a bus 110. The bus 110 may be a PCI bus, an EISA bus, or the like. The bus may be classified into an address bus, a data bus, a control bus, and the like. For ease of representation, only one thick line is used to represent the bus in FIG. 16, but this does not mean that there is only one bus or only one type of bus. The memory 140 is configured to store the program code and data of the second management unit. The communications interface 130 is configured to support the second management unit in communicating with another device (for example, the first management unit). The processor 120 is configured to support the second management unit in executing the program code and data that are stored in the memory 140, to implement an information configuration method provided in an embodiment of this application.

Figure 17:
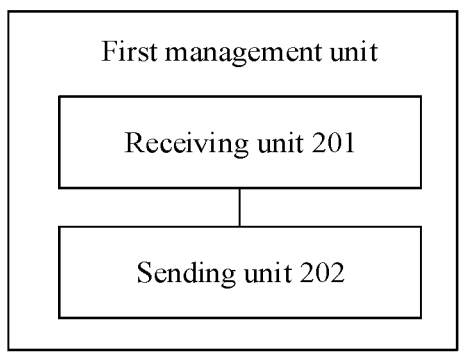
FIG. 17 is a schematic structural diagram of a first management unit according to an embodiment of the present invention.

When an integrated unit is used, FIG. 17 is a possible schematic structural diagram of the first management unit in the foregoing embodiments. The first management unit includes a receiving unit 201 and a sending unit 202. The receiving unit 201 is configured to support the first management unit in receiving an association relationship that is sent by a second management unit and that is between information about an AMF group and network slice information, where the AMF group is one of at least one AMF group, and the network slice information is one of at least one piece of network slice information, and receiving at least one association relationship that is sent by an NSMF and that is in an association relationship between network slice information and information about an AMF group and an association relationship between the information about the AMF group and network slice selection assistance information S-NSSAI. The sending unit 202 is configured to support the first management unit in performing operations S103 and S106 in the foregoing embodiments, and/or another process in the technologies described in this specification. All related content of the operations in the foregoing method embodiments may be cited in function descriptions of the corresponding function modules. Details are not described herein again.

Based on hardware implementation, the receiving unit 201 may be a receiver of the first management unit, and the sending unit 202 may be a transmitter of the first management unit. Usually, the receiver and the transceiver may be integrated together to serve as a transceiver. Specifically, the receiving unit 201 and the sending unit 202 may be a communications interface of the first management unit.

Figure 18:
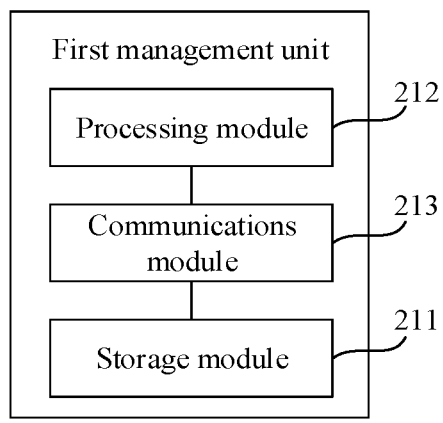
FIG. 18 is a schematic structural diagram of another first management unit according to an embodiment of the present invention.

When an integrated unit is used, FIG. 18 is a possible schematic diagram of a logic structure of the first management unit in the foregoing embodiments. The first management unit includes a processing module 212 and a communications module 213. The processing module 212 is configured to control and manage an action of the first management unit. For example, the processing module 212 is configured to: support the first management unit in receiving, using the communications module 213, at least one association relationship that is sent by an NSMF and that is in an association relationship between information about an AMF group and information about a first AMF and an association relationship between the information about the AMF group and network slice selection assistance information S-NSSAI, and an association relationship between the information about the access management function group and network slice information, where the AMF group is one of at least one access management function group, and the network slice information is one of at least one piece of network slice information; and support the first management unit in performing operations S103 and S106 using the communications module 213. The first management unit may further include a storage module 211, configured to store program code and data of the first management unit.

The processing module 212 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in embodiments of the present invention. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 19:
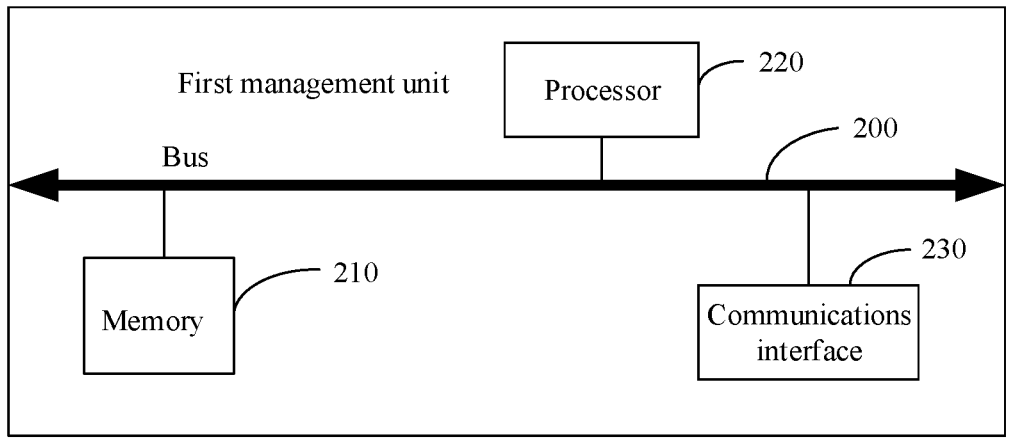
FIG. 19 is a schematic structural diagram of still another first management unit according to an embodiment of the present invention.

When the processing module 212 is a processor 220, the communications module 213 is a communications interface 230 or a transceiver, and the storage module 211 is a memory 210, the first management unit may be a device shown in FIG. 19.

The communications interface 230, the processor 220, and the memory 210 are connected to each other using a bus 200. The bus 200 may be a PCI bus, an EISA bus, or the like. The bus may be classified into an address bus, a data bus, a control bus, and the like. For ease of representation, only one thick line is used to represent the bus in FIG. 19, but this does not mean that there is only one bus or only one type of bus. The memory 210 is configured to store the program code and data of the first management unit. The communications interface 230 is configured to support the first management unit in communicating with another device (for example, the second management unit). The processor 220 is configured to support the first management unit in executing the program code and data that are stored in the memory 210, to implement an information configuration method provided in an embodiment of this application.

Figure 20:
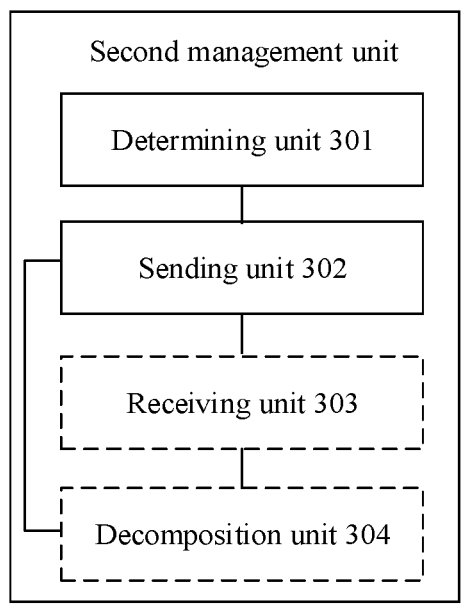
FIG. 20 is a schematic structural diagram of yet another second management unit according to an embodiment of the present invention.

When an integrated unit is used, FIG. 20 is a possible schematic structural diagram of the second management unit in the foregoing embodiments. The second management unit includes a determining unit 301 and a sending unit 302. The determining unit 301 is configured to support the second management unit in performing operations S203, S210, and S214 in the foregoing embodiments. The sending unit 302 is configured to support the second management unit in performing operations S204, S207, S211, and S215 in the foregoing embodiments. In addition, the first management unit provided in an embodiment of this application further includes a receiving unit 303 and a decomposition unit 304, where the receiving unit 303 is configured to support the second management unit in performing S205 in the foregoing embodiments; and the decomposition unit 304 is configured to support the second management unit in performing operation S206 in the foregoing embodiments, and/or another process in the technologies described in this specification. All related content of the operations in the foregoing method embodiments may be cited in function descriptions of the corresponding function modules. Details are not described herein again.

Based on hardware implementation, the receiving unit 303 may be a receiver of the second management unit, and the sending unit 302 may be a transmitter of the second management unit. Usually, the receiver and the transceiver may be integrated together to serve as a communications interface. As shown in FIG. 16, specifically, the receiving unit 303 and the sending unit 302 may be a communications interface of the second management unit, the determining unit 301 and the decomposition unit 304 may be integrated into a processor of the second management unit shown in FIG. 16.

Figure 21:
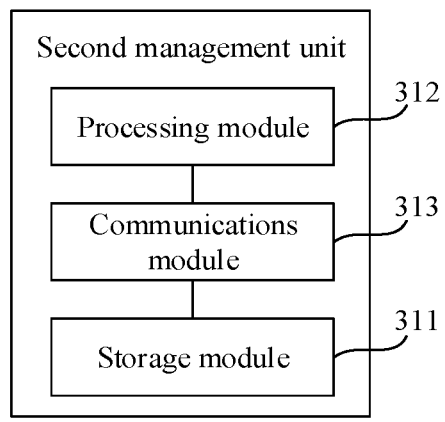
FIG. 21 is another schematic structural diagram of a second management unit according to an embodiment of the present invention.

When an integrated unit is used, FIG. 21 is a possible schematic diagram of a logic structure of the second management unit in the foregoing embodiments. The second management unit includes a processing module 312 and a communications module 313. The processing module 312 is configured to control and manage an action of the second management unit. For example, the processing module 312 is configured to support the second management unit in performing S203, S210, S214, and S206 in the foregoing embodiments. The communications module 313 is configured to support the second management unit in performing S204, S207, S211, S215, and S205 in the foregoing embodiments, and/or another process in the technologies described in this specification. The communications module 313 is mainly configured to communicate with a first management unit or a first network unit (for example, a gNB and an NSSF). The second management unit may further include a storage module 311, configured to store program code and data of the second management unit.

The processing module 312 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in embodiments of the present invention. Alternatively, the processor may be a combination of processors implementing a computing function, for example, a combination of one or more microprocessors, or a combination of a digital signal processor and a microprocessor. The communications module 313 may be a transceiver, a transceiver circuit, a communications interface, or the like. The storage module 311 may be a memory.

When the processing module 312 is a processor, the communications module 313 is a communications interface or a transceiver, and the storage module 311 is a memory, the second management unit may be the device shown in FIG. 16.

Figure 22:
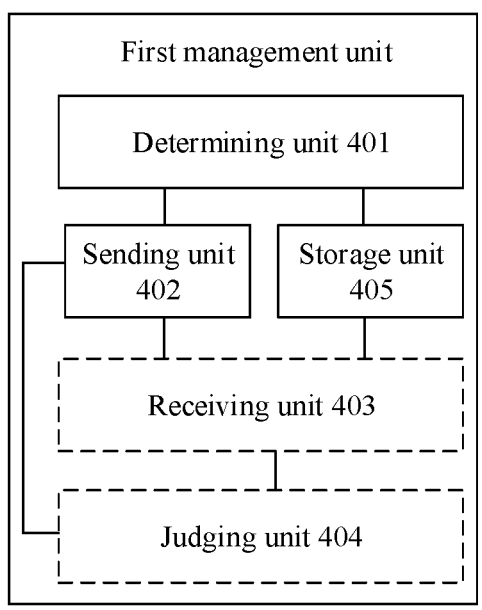
FIG. 22 is a schematic structural diagram of yet another first management unit according to an embodiment of the present invention.

When an integrated unit is used, FIG. 22 is a possible schematic structural diagram of the first management unit in the foregoing embodiments. The first management unit includes a determining unit 401 and a sending unit 402. The determining unit 401 is configured to support the first management unit in performing operations S201, S201*b*, S201*d*, S208, S208*a*, S208*d*, and S213 in the foregoing embodiments. The sending unit 402 is configured to support the first management unit in performing operations S202, S209, and S213 in the foregoing embodiments. In addition, the first management unit provided in an embodiment of this application further includes a receiving unit 403, a judging unit 404, and a storage unit 405. The receiving unit 403 is configured to support the first management unit in performing operations S201*a*, S201*c*, S208*b*, and S208*c* in the foregoing embodiments. The judging unit 404 is configured to support the first management unit in performing operation S212 in the foregoing embodiments. The storage unit 405 is configured to support the first management unit in storing the association relationship and performing a specific implementation process of storing the association relationship, and/or another process described in this specification. All related content of the operations in the foregoing method embodiments may be cited in function descriptions of the corresponding function modules. Details are not described herein again.

Based on hardware implementation, the receiving unit 403 may be a receiver of the first management unit, and the sending unit 402 may be a transmitter of the first management unit. Usually, the receiver and the transceiver may be integrated together to serve as a transceiver. Specifically, the receiving unit 403 and the sending unit 402 may be a communications interface of the first management unit. The judging unit 404 and the determining unit 401 may be integrated into a processor of the first management unit, and the storage unit 405 may be integrated into a memory of the first management unit.

Figure 23:
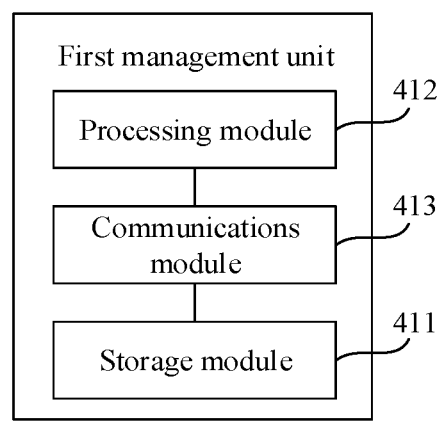
FIG. 23 is another schematic structural diagram of a first management unit according to an embodiment of the present invention.

When an integrated unit is used, FIG. 23 is a possible schematic diagram of a logic structure of the first management unit in the foregoing embodiments. The first management unit includes a processing module 412 and a communications module 413. The processing module 412 is configured to control and manage an action of the first management unit. For example, the processing module 412 is configured to support the first management unit in performing operations S201, S201*b*, S201*d*, S208, S208*a*, S208*d*, S213, and/or S212 in the foregoing embodiments. The communications module 413 is configured to support the first management unit in performing S201*a*, S201*c*, S208*b*, and S208*c* in the foregoing embodiments, and/or another process in the technologies described in this specification. The communications module 413 is mainly configured to communicate with a second management unit or a first network unit (for example, a gNB and an NSSF). The first management unit may further include a storage module 411, configured to: store program code and data of the first management unit, and support the first management unit in storing the association relationship and performing a specific implementation process of storing the association relationship.

The processing module 412 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 412 may implement or execute various example logical blocks, modules, and circuits described with reference to content disclosed in embodiments of the present invention. Alternatively, the processor may be a combination of processors implementing a computing function, for example, a combination of one or more microprocessors, or a combination of a digital signal processor and a microprocessor. The communications module 413 may be a transceiver, a transceiver circuit, a communications interface, or the like. The storage module 411 may be a memory.

When the processing module 412 is a processor, the communications module 413 is a communications interface or a transceiver, and the storage module 411 is a memory, the first management unit may be the device shown in FIG. 19.

In another embodiment of the present invention, a computer readable storage medium is further provided. The computer readable storage medium stores a computer executable instruction. When at least one processor of a first management unit executes the computer executable instruction, the first management unit performs operations S201, S201*b*, S201*d*, S208, S208*a*, S208*d*, S213, S212, S201*a*, S201*c*, S208*b*, and/or S208*c* in the foregoing embodiments, or other operations performed by the first management unit in the foregoing embodiments (for example, receiving an association relationship that is sent by an NSMF and that is between an access management function group and network slice information, receiving at least one association relationship that is sent by the NSMF and that is in an association relationship between the access management function AMF group and each of one or more AMFs included in the access management function AMF group and an association relationship between the access management function group and network slice selection assistance information S-NSSAI, and performing operations S103 and S106).

In another embodiment of the present invention, a computer readable storage medium is further provided. The computer readable storage medium stores a computer executable instruction. When at least one processor of a second management unit executes the computer executable instruction, the second management unit performs operation S101 (which may be specifically S1011, S1011*a*, and S1011*b*), S1013, S1013*b*, S1013*a*1, S1013*a*2, S1013*a*4, S104 (which may be specifically operation S1041), S1013*a*, S1013*a*3, S102, S105, and/or S1012 in the foregoing embodiments, or other operations (for example, operations S203, S204, S205, S206, S207, S210, S211, S214, and/or S215) performed by the second management unit in the foregoing embodiments.

In another embodiment of the present invention, a computer program product is further provided. The computer program product includes a computer executable instruction, and the computer executable instruction is stored in a computer readable storage medium. At least one processor of a first management unit may read the computer executable instruction from the computer readable storage medium, and the at least one processor of the first management unit executes the computer executable instruction, to enable the first management unit to perform the foregoing operations. When the at least one processor of the first management unit executes the computer executable instruction, the first management unit performs operations S201, S201b, S201d, S208, S208a, S208d, S213, operation S212, S201a, S201c, S208b, and/or S208c in the foregoing embodiments, or other operations performed by the first management unit in the foregoing embodiments (for example, receiving an association relationship that is sent by an NSMF and that is between a first access management function group and first network slice information, receiving at least one association relationship that is sent by the NSMF and that is in an association relationship between the access management function AMF group and a first AMF and an association relationship between the access management function group and network slice selection assistance information S-NSSAI, and performing operations S103 and S106).

In another embodiment of the present invention, a computer program product is further provided. The computer program product includes a computer executable instruction, and the computer executable instruction is stored in a computer readable storage medium. At least one processor of a second management unit may read the computer executable instruction from the computer readable storage medium, and the at least one processor of the second management unit executes the computer executable instruction, to enable the second management unit to implement S101 (which may be specifically operations S1011, S1011a, and/or S1011b), S1013, S1013b, S1013a1, S1013a2, S1013a4, S104 (which may be specifically operation S1041), S1013a, S1013a3, S102, S105, and/or S1012 in the foregoing embodiments, or other operations (for example, S203, S210, S214, S206, S204, S207, S211, S215, and/or S205) performed by the second management unit in the foregoing embodiments.

In another embodiment of the present invention, a network management system is further provided. The network management system includes a first management unit and a second management unit. The first management unit uses a structure shown in FIG. 17, FIG. 18, or FIG. 19, and the second management unit uses a structure shown in FIG. 14, FIG. 15, or FIG. 16. The first management unit is configured to: receive at least one association relationship that is sent by an NSMF and that is in an association relationship between an access management function AMF group and each of one or more AMFs included in the access management function AMF group and an association relationship between the access management function group and network slice selection assistance information S-NSSAI, and an association relationship between the access management function group and AMF selection information, and perform operations S103 and S106. The second management unit is configured to perform operations S101 (which may be specifically operations S1011, S1011a, and/or S1011b), S1013, S1013b, S1013a1, S1013a2, S1013a4, S104 (which may be specifically S1041), S1013a, S1013a3, S102, S105, and/or S1012.

In another embodiment of the present invention, a network management system is further provided. The network management system includes a first management unit and a second management unit. The first management unit uses a structure shown in FIG. 22, FIG. 23, or FIG. 19, and the second management unit uses a structure shown in FIG. 20, FIG. 21, or FIG. 16. The first management unit is configured to perform operations S201, S201b, S201d, S208, S208a, S208d, S213, and/or operations S212, S201a, S201c, S208b, and/or S208c. The second management unit is configured to perform operations S203, S210, S214, S206, S204, S207, S211, S215, and/or S205.

A network device is configured to receive at least one association relationship that is sent by the first management unit or the second management unit and that is in an association relationship between a first AMF and an access management function group and an association relationship between the access management function group and network slice selection assistance information S-NSSAI. An NSSF is configured to receive an association relationship that is sent by the first management unit or the second management unit and that is between the first access management function group and first network slice information, to select, based on a registration request of a user, an identifier of an access management function group meeting the registration request, and send the identifier to an AN.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in embodiments of this application shall fall within the protection scope of this application. Therefore, the protection scope of this application shall be subject to the protection scope of the claims.

What is claimed is:

1. An information configuration method, comprising:
   receiving, by a receiver of a first management unit, network requirement information;
   determining, by a processor of the first management unit, an association relationship between information about an access management function (AMF) group and network slice information based on the network requirement information, wherein the association relationship is used to instruct to select the network slice information based on the information about the AMF group or select the information about the AMF group based on the network slice information; and
   sending, by a transmitter of the first management unit, the association relationship to a receiver of a first network unit or a management unit of the first network unit; or storing, by the first management unit, the association relationship.

2. The information configuration method according to claim 1, wherein the information about the AMF group comprises any one of the following: an identifier of the AMF group and an identifier of a management object of the AMF group.

3. The information configuration method according to claim 1, wherein the network slice information comprises any one or more of the following:
   a network slice instance identifier, a network slice instance management object identifier, a network slice subnet instance identifier, a network slice subnet management object identifier, single-network slice selection assistance information (S-NSSAI), a network slice type, a service type, a tenant identifier, and a public land mobile network (PLMN).

4. The information configuration method according to claim 1, wherein the storing, by the first management unit, the association relationship comprises any one of the following:
   configuring, by the first management unit, the network slice information in the AMF group or a management object of the AMF group;
   configuring, by the first management unit, the information about the AMF group in a network slice or a network slice management object; or
   configuring, by the first management unit, the information about the AMF group in a network slice subnet or a network slice subnet management object.

5. The information configuration method according to claim 1, wherein the first management unit comprises a network slice management unit (NSMF) or a network slice subnet management function (NSSMF).

6. The information configuration method according to claim 1, wherein the method further comprise:
   determining, by the first management unit, an association relationship between the information about the AMF group and information about a first AMF, wherein the first AMF is at least one of a plurality of AMFs included in the AMF group; and
   sending, by the first management unit, the association relationship between the information about the AMF group and the information about the first AMF to a second network unit or a management unit of a second network unit; or storing, by the first management unit, the association relationship between the information about the AMF group and the information about the first AMF.

7. A first management unit, comprising: a memory, a processor, a bus, and a communications interface, wherein the memory stores code and data, the processor is connected to the memory using the bus, and
   the communications interface is configured to receive network requirement information;
   the processor is configured to determine an association relationship between information about an access management function (AMF) group and network slice information based on the network requirement information, wherein the association relationship is used to instruct to select the network slice information based on the information about the AMF group or select the information about the AMF group based on the network slice information; and
   the communications interface is further configured to send the association relationship to a first network unit or a management unit of a first network unit; or the processor is configured to store the association relationship in the memory.

8. The first management unit according to claim 7, wherein the information about the AMF group comprises any one of the following: an identifier of the AMF group, an identifier of a management object of the AMF group, and a name of the AMF group.

9. The first management unit according to claim 7, wherein the network slice information comprises any one or more of the following:
   a network slice instance identifier, a network slice instance management object identifier, a network slice subnet instance identifier, a network slice subnet management object identifier, single-network slice selection assistance information (S-NSSAI), a network slice type, a service type, a tenant identifier, and a public land mobile communications network (PLMN).

10. The first management unit according to claim 7, wherein:
    the processor is configured to configure the network slice information in the AMF group or a management object of the AMF group;

the processor is configured to configure the information about the AMF group in a network slice or a network slice management object; or the processor is configured to configure the information about the AMF group in a network slice subnet or a network slice subnet management object.

11. The first management unit according to claim 7, wherein the first management unit comprises a network slice management unit (NSMF) or a network slice subnet management function (NSSMF).

12. The first management unit according to claim 7, wherein the processor is further configured to determine an association relationship between the information about the AMF group and information about a first AMF, wherein the first AMF is at least one of a plurality of AMFs included in the AMF group; and the communications interface is further configured to send the association relationship between the information about the AMF group and the information about the first AMF to a second network unit or a management unit of a second network unit; or the processor is configured to store the association relationship between the information about the AMF group and the information about the first AMF.

13. A non-transitory computer readable storage medium, storing a computer program, wherein when the program is run on a first management unit, cause a computer to:

receive network requirement information;

determine an association relationship between information about an access management function (AMF) group and network slice information based on the network requirement information, wherein the association relationship is used to instruct to select the network slice information based on the information about the AMF group or select the information about the AMF group based on the network slice information; and send the association relationship to a receiver of a first network unit or a receiver of a management unit of the first network unit; or storing the association relationship.

14. The non-transitory computer readable storage medium according to claim 13, wherein the information about the AMF group comprises any one of the following:

an identifier of the AMF group and an identifier of a management object of the AMF group.

15. The non-transitory computer readable storage medium according to claim 13, wherein the network slice information comprises any one or more of the following:

a network slice instance identifier, a network slice instance management object identifier, a network slice subnet instance identifier, a network slice subnet management object identifier, single-network slice selection assistance information (S-NSSAI), a network slice type, a service type, a tenant identifier, and a public land mobile network (PLMN).

16. The non-transitory computer readable storage medium according to claim 13, wherein the computer is further to:

configure the network slice information in the AMF group or a management object of the AMF group;

configure the information about the AMF group in a network slice or a network slice management object; or configure the information about the AMF group in a network slice subnet or a network slice subnet management object.

17. The non-transitory computer readable storage medium according to claim 13, wherein the first management unit comprises a network slice management unit (NSMF) or a network slice subnet management function (NSSMF).

18. The non-transitory computer readable storage medium according to claim 13, wherein the computer is further to:

determine an association relationship between the information about the AMF group and information about a first AMF, wherein the first AMF is at least one of a plurality of AMFs included in the AMF group; and send the association relationship between the information about the AMF group and the information about the first AMF to a second network unit or a management unit of a second network unit; or store the association relationship between the information about the AMF group and the information about the first AMF.

* * * * *